United States Patent
Montgomery et al.

(10) Patent No.: US 12,490,904 B2
(45) Date of Patent: Dec. 9, 2025

(54) ENHANCED IMAGE FOR NON-CONTACT MONITORING

(71) Applicant: Covidien LP, Mansfield, MA (US)

(72) Inventors: Dean Montgomery, Edinburgh (GB); Paul S. Addison, Edinburgh (GB); Dominique Jacquel, Edinburgh (GB)

(73) Assignee: Covidien LP, Mansfield, MA (US)

( * ) Notice: Subject to any disclaimer, the term of this patent is extended or adjusted under 35 U.S.C. 154(b) by 488 days.

(21) Appl. No.: 17/814,946

(22) Filed: Jul. 26, 2022

(65) Prior Publication Data

US 2023/0112712 A1    Apr. 13, 2023

Related U.S. Application Data

(60) Provisional application No. 63/257,251, filed on Oct. 19, 2021, provisional application No. 63/253,953, filed on Oct. 8, 2021.

(51) Int. Cl.
*A61B 5/00* (2006.01)
*G06T 7/00* (2017.01)
*G06T 7/50* (2017.01)

(52) U.S. Cl.
CPC .......... *A61B 5/0077* (2013.01); *G06T 7/0012* (2013.01); *G06T 7/50* (2017.01); *G06T 2207/10028* (2013.01); *G06T 2207/30201* (2013.01)

(58) Field of Classification Search
CPC ... A61B 5/0077; A61B 5/0075; A61B 5/0816; A61B 5/1135; G06T 7/0012; G06T 7/50; G06T 2207/10028; G06T 2207/30201; G06T 11/001
See application file for complete search history.

(56) References Cited

U.S. PATENT DOCUMENTS

| | | | |
|---|---|---|---|
| 5,107,845 | A | 4/1992 | Guern et al. |
| 5,408,998 | A | 4/1995 | Mersch |
| 5,704,367 | A | 1/1998 | Ishikawa et al. |
| 5,800,360 | A | 9/1998 | Kisner et al. |

(Continued)

FOREIGN PATENT DOCUMENTS

| | | |
|---|---|---|
| CA | 2234191 A1 | 10/1998 |
| CN | 106725410 A | 5/2017 |

(Continued)

OTHER PUBLICATIONS

Machine translation for CN 113273963 (Year: 2021).*

(Continued)

*Primary Examiner* — Qian Yang
(74) *Attorney, Agent, or Firm* — Draft Masters IP, LLC

(57) ABSTRACT

Methods for enhancing the image of a subject, such as a patient, in a video non-contact monitoring system to provide an enhanced image with clear distinction of the subject from the background. The methods include applying a histogram equalization transform, such as a contrast limited adaptive histogram equalization (CLAHE) transform, to the depth data obtained from a camera of the monitoring system. In some embodiments, the enhanced image of the subject is merged with an overlay image of a monitored physiological parameter determined by the non-contact patient monitoring system.

6 Claims, 14 Drawing Sheets

(56) References Cited

U.S. PATENT DOCUMENTS

| | | |
|---|---|---|
| 5,995,856 A | 11/1999 | Mannheimer et al. |
| 6,241,684 B1 | 6/2001 | Amano et al. |
| 6,668,071 B1 | 12/2003 | Minkin et al. |
| 6,920,236 B2 | 7/2005 | Prokoski |
| 7,431,700 B2 | 10/2008 | Aoki et al. |
| 7,558,618 B1 | 7/2009 | Williams |
| 8,149,273 B2 | 4/2012 | Liu et al. |
| 8,754,772 B2 | 6/2014 | Horng et al. |
| 8,792,969 B2 | 7/2014 | Bernal et al. |
| 8,971,985 B2 | 3/2015 | Bernal et al. |
| 9,226,691 B2 | 1/2016 | Bernal et al. |
| 9,282,725 B2 | 3/2016 | Jensen-Jarolim et al. |
| 9,301,710 B2 | 4/2016 | Mestha et al. |
| 9,402,601 B1 | 8/2016 | Berger et al. |
| 9,436,984 B2 | 9/2016 | Xu et al. |
| 9,443,289 B2 | 9/2016 | Xu et al. |
| 9,504,426 B2 | 11/2016 | Kyal et al. |
| 9,508,141 B2 | 11/2016 | Khachaturian et al. |
| 9,607,138 B1 | 3/2017 | Baldwin et al. |
| 9,662,022 B2 | 5/2017 | Kyal et al. |
| 9,693,693 B2 | 7/2017 | Farag et al. |
| 9,693,710 B2 | 7/2017 | Mestha et al. |
| 9,697,599 B2 | 7/2017 | Prasad et al. |
| 9,750,461 B1 | 9/2017 | Telfort |
| 9,839,756 B2 | 12/2017 | Klasek |
| 9,943,371 B2 | 4/2018 | Bresch et al. |
| 10,213,540 B2 | 2/2019 | Burbank et al. |
| 10,278,585 B2 | 5/2019 | Ferguson et al. |
| 10,376,147 B2 | 8/2019 | Wood et al. |
| 10,398,353 B2 | 9/2019 | Addison et al. |
| 10,447,972 B2 | 10/2019 | Patil |
| 10,489,912 B1 | 11/2019 | Brailovskiy |
| 10,523,852 B2 | 12/2019 | Tzvieli et al. |
| 10,588,779 B2 | 3/2020 | Vorhees et al. |
| 10,589,916 B2 | 3/2020 | Mcrae |
| 10,650,585 B2 | 5/2020 | Kiely |
| 10,667,723 B2 | 6/2020 | Jacquel et al. |
| 10,702,188 B2 | 7/2020 | Addison et al. |
| 10,729,357 B2 | 8/2020 | Larson et al. |
| 10,874,331 B2 | 12/2020 | Kaiser et al. |
| 10,937,296 B1 | 3/2021 | Kukreja et al. |
| 10,939,824 B2 | 3/2021 | Addison et al. |
| 10,939,834 B2 | 3/2021 | Khwaja et al. |
| 10,966,059 B1 | 3/2021 | Dayal et al. |
| 11,311,252 B2 | 4/2022 | Jacquel et al. |
| 11,315,275 B2 | 4/2022 | Addison et al. |
| 11,317,828 B2 | 5/2022 | Addison et al. |
| 11,350,850 B2 | 6/2022 | Jacquel et al. |
| 11,850,026 B2 | 12/2023 | Levi et al. |
| 2002/0137464 A1 | 9/2002 | Dolgonos et al. |
| 2004/0001633 A1 | 1/2004 | Caviedes |
| 2004/0258285 A1 | 12/2004 | Hansen et al. |
| 2005/0203348 A1 | 9/2005 | Shihadeh et al. |
| 2007/0116328 A1 | 5/2007 | Sablak et al. |
| 2008/0001735 A1 | 1/2008 | Tran |
| 2008/0108880 A1 | 5/2008 | Young et al. |
| 2008/0279420 A1 | 11/2008 | Masticola et al. |
| 2008/0295837 A1 | 12/2008 | McCormick et al. |
| 2009/0024012 A1 | 1/2009 | Li et al. |
| 2009/0141124 A1 | 6/2009 | Liu et al. |
| 2009/0304280 A1 | 12/2009 | Aharoni et al. |
| 2010/0210924 A1 | 8/2010 | Parthasarathy et al. |
| 2010/0236553 A1 | 9/2010 | Jafari et al. |
| 2010/0249630 A1 | 9/2010 | Droitcour et al. |
| 2010/0324437 A1 | 12/2010 | Freeman et al. |
| 2011/0144517 A1 | 6/2011 | Cervantes |
| 2011/0150274 A1 | 6/2011 | Patwardhan et al. |
| 2012/0065533 A1 | 3/2012 | Carrillo et al. |
| 2012/0075464 A1 | 3/2012 | Derenne et al. |
| 2012/0195473 A1 | 8/2012 | De Haan et al. |
| 2012/0243797 A1 | 9/2012 | Di Venuto Dayer et al. |
| 2013/0073312 A1 | 3/2013 | Thompson et al. |
| 2013/0267873 A1 | 10/2013 | Fuchs |
| 2013/0271591 A1 | 10/2013 | Van Leest et al. |
| 2013/0272393 A1 | 10/2013 | Kirenko et al. |
| 2013/0275873 A1 | 10/2013 | Shaw et al. |
| 2013/0324830 A1 | 12/2013 | Bernal et al. |
| 2013/0324876 A1 | 12/2013 | Bernal et al. |
| 2014/0023235 A1 | 1/2014 | Cennini et al. |
| 2014/0052006 A1 | 2/2014 | Lee et al. |
| 2014/0053840 A1 | 2/2014 | Liu |
| 2014/0073860 A1 | 3/2014 | Urtti |
| 2014/0139405 A1 | 5/2014 | Ribble et al. |
| 2014/0140592 A1 | 5/2014 | Lasenby et al. |
| 2014/0235976 A1 | 8/2014 | Bresch et al. |
| 2014/0267718 A1 | 9/2014 | Govro et al. |
| 2014/0272860 A1 | 9/2014 | Peterson et al. |
| 2014/0275832 A1 | 9/2014 | Muehlsteff et al. |
| 2014/0276104 A1 | 9/2014 | Tao et al. |
| 2014/0330336 A1 | 11/2014 | Errico et al. |
| 2014/0334697 A1 | 11/2014 | Kersten et al. |
| 2014/0358017 A1 | 12/2014 | Op Den Buijs et al. |
| 2014/0378810 A1 | 12/2014 | Davis et al. |
| 2014/0379369 A1 | 12/2014 | Kokovidis et al. |
| 2015/0003723 A1 | 1/2015 | Huang et al. |
| 2015/0068069 A1 | 3/2015 | Tran et al. |
| 2015/0094597 A1 | 4/2015 | Mestha et al. |
| 2015/0131880 A1 | 5/2015 | Wang et al. |
| 2015/0157269 A1 | 6/2015 | Lisogurski et al. |
| 2015/0198707 A1 | 7/2015 | Al-Alusi |
| 2015/0223731 A1 | 8/2015 | Sahin |
| 2015/0238150 A1 | 8/2015 | Subramaniam |
| 2015/0265187 A1 | 9/2015 | Bernal et al. |
| 2015/0282724 A1 | 10/2015 | Mcduff et al. |
| 2015/0286779 A1 | 10/2015 | Bala et al. |
| 2015/0301590 A1 | 10/2015 | Furst et al. |
| 2015/0317814 A1 | 11/2015 | Johnston et al. |
| 2015/0379370 A1 | 12/2015 | Clifton et al. |
| 2016/0000335 A1 | 1/2016 | Khachaturian et al. |
| 2016/0049094 A1 | 2/2016 | Gupta et al. |
| 2016/0082222 A1 | 3/2016 | Garcia Molina et al. |
| 2016/0140828 A1 | 5/2016 | Deforest |
| 2016/0143598 A1 | 5/2016 | Rusin et al. |
| 2016/0151022 A1 | 6/2016 | Berlin et al. |
| 2016/0156835 A1 | 6/2016 | Ogasawara et al. |
| 2016/0174887 A1 | 6/2016 | Kirenko et al. |
| 2016/0210747 A1 | 7/2016 | Hay et al. |
| 2016/0235344 A1 | 8/2016 | Auerbach |
| 2016/0310084 A1 | 10/2016 | Banerjee et al. |
| 2016/0317041 A1 | 11/2016 | Porges et al. |
| 2016/0345931 A1 | 12/2016 | Xu et al. |
| 2016/0367186 A1 | 12/2016 | Freeman et al. |
| 2017/0007342 A1 | 1/2017 | Kasai et al. |
| 2017/0007795 A1 | 1/2017 | Pedro et al. |
| 2017/0055877 A1 | 3/2017 | Niemeyer |
| 2017/0065484 A1 | 3/2017 | Addison et al. |
| 2017/0071516 A1 | 3/2017 | Bhagat et al. |
| 2017/0095215 A1 | 4/2017 | Watson et al. |
| 2017/0095217 A1 | 4/2017 | Hubert et al. |
| 2017/0119340 A1 | 5/2017 | Nakai et al. |
| 2017/0147772 A1 | 5/2017 | Meehan et al. |
| 2017/0164904 A1 | 6/2017 | Kirenko |
| 2017/0172434 A1 | 6/2017 | Amelard et al. |
| 2017/0173262 A1 | 6/2017 | Veltz |
| 2017/0238805 A1 | 8/2017 | Addison et al. |
| 2017/0238842 A1 | 8/2017 | Jacquel et al. |
| 2017/0311887 A1 | 11/2017 | Leussler et al. |
| 2017/0319114 A1 | 11/2017 | Kaestle |
| 2017/0359488 A1* | 12/2017 | Chen .................. G06T 1/20 |
| 2018/0042486 A1 | 2/2018 | Yoshizawa et al. |
| 2018/0042500 A1 | 2/2018 | Liao et al. |
| 2018/0049669 A1 | 2/2018 | Vu et al. |
| 2018/0053392 A1 | 2/2018 | White et al. |
| 2018/0104426 A1 | 4/2018 | Oldfield et al. |
| 2018/0106897 A1 | 4/2018 | Shouldice et al. |
| 2018/0169361 A1 | 6/2018 | Dennis et al. |
| 2018/0217660 A1 | 8/2018 | Dayal et al. |
| 2018/0228381 A1 | 8/2018 | Leboeuf et al. |
| 2018/0303351 A1 | 10/2018 | Mestha et al. |
| 2018/0310844 A1 | 11/2018 | Tezuka et al. |
| 2018/0325420 A1 | 11/2018 | Gigi |
| 2018/0333050 A1 | 11/2018 | Greiner et al. |
| 2018/0333102 A1 | 11/2018 | De Haan et al. |
| 2018/0352150 A1 | 12/2018 | Purwar et al. |

(56) References Cited

U.S. PATENT DOCUMENTS

| | | |
|---|---|---|
| 2019/0050985 A1 | 2/2019 | Den Brinker et al. |
| 2019/0133499 A1 | 5/2019 | Auerbach |
| 2019/0142274 A1 | 5/2019 | Addison et al. |
| 2019/0199970 A1 | 6/2019 | Greiner et al. |
| 2019/0209046 A1 | 7/2019 | Addison et al. |
| 2019/0209083 A1 | 7/2019 | Wu et al. |
| 2019/0307365 A1 | 10/2019 | Addison et al. |
| 2019/0311101 A1 | 10/2019 | Nienhouse |
| 2019/0343480 A1 | 11/2019 | Shute et al. |
| 2019/0380599 A1 | 12/2019 | Addison et al. |
| 2019/0380807 A1 | 12/2019 | Addison et al. |
| 2020/0046302 A1 | 2/2020 | Jacquel et al. |
| 2020/0187827 A1 | 6/2020 | Addison et al. |
| 2020/0202154 A1 | 6/2020 | Wang et al. |
| 2020/0205734 A1 | 7/2020 | Mulligan et al. |
| 2020/0237225 A1 | 7/2020 | Addison et al. |
| 2020/0242790 A1 | 7/2020 | Addison et al. |
| 2020/0250406 A1 | 8/2020 | Wang et al. |
| 2020/0253560 A1 | 8/2020 | De Haan |
| 2020/0279464 A1 | 9/2020 | Llewelyn |
| 2020/0289024 A1 | 9/2020 | Addison et al. |
| 2020/0329976 A1 | 10/2020 | Chen et al. |
| 2020/0409383 A1 | 12/2020 | Maunder |
| 2021/0068670 A1 | 3/2021 | Redtel |
| 2021/0142874 A1 | 5/2021 | Llewelyn |
| 2021/0153746 A1 | 5/2021 | Addison et al. |
| 2021/0201517 A1 | 7/2021 | Yang et al. |
| 2021/0233631 A1 | 7/2021 | Llewelyn |
| 2021/0235992 A1 | 8/2021 | Addison |
| 2021/0295662 A1 | 9/2021 | Bugbee et al. |
| 2021/0313075 A1 | 10/2021 | Mc Namara et al. |
| 2022/0211296 A1 | 7/2022 | Addison et al. |
| 2022/0261962 A1* | 8/2022 | Duval .................... G06T 7/262 |
| 2023/0122367 A1 | 4/2023 | Tesar |

FOREIGN PATENT DOCUMENTS

| | | | |
|---|---|---|---|
| CN | 111728602 A | | 10/2020 |
| CN | 112233813 A | | 1/2021 |
| CN | 113273963 | * | 8/2021 |
| DE | 19741982 A1 | | 10/1998 |
| EP | 2793189 B1 | | 11/2016 |
| EP | 2428162 B1 | | 8/2017 |
| EP | 3207862 A1 | | 8/2017 |
| EP | 3207863 A1 | | 8/2017 |
| EP | 3384827 A1 | | 10/2018 |
| EP | 2772828 B1 | | 1/2019 |
| JP | 2004173010 A | | 6/2004 |
| JP | 2004283373 A | | 10/2004 |
| JP | 3744778 B2 | | 12/2005 |
| JP | 2009544080 A | | 12/2009 |
| JP | 2011130996 A | | 7/2011 |
| KR | 101644843 B1 | | 8/2016 |
| RS | 20120373 A1 | | 4/2014 |
| WO | 2004100067 A2 | | 11/2004 |
| WO | 2005079658 A2 | | 9/2005 |
| WO | 2010034107 A1 | | 4/2010 |
| WO | 2010036653 A1 | | 4/2010 |
| WO | 2015059700 A1 | | 4/2015 |
| WO | 2015078735 A1 | | 6/2015 |
| WO | 2015110859 A1 | | 7/2015 |
| WO | 2016065411 A1 | | 5/2016 |
| WO | 2016178141 A1 | | 11/2016 |
| WO | 2016209491 A1 | | 12/2016 |
| WO | 2017060463 A1 | | 4/2017 |
| WO | 2017089139 A1 | | 6/2017 |
| WO | 2017100188 A2 | | 6/2017 |
| WO | 2017144934 A1 | | 8/2017 |
| WO | 2018042376 A1 | | 3/2018 |
| WO | 2019094893 A1 | | 5/2019 |
| WO | 2019135877 A1 | | 7/2019 |
| WO | 2019240991 A1 | | 12/2019 |
| WO | 2020033613 A1 | | 2/2020 |
| WO | 2021044240 A1 | | 3/2021 |

OTHER PUBLICATIONS

"European Search Report", European Application No. 17156334.9, Applicant: Covidien LP, Aug. 23, 2017, 10 pages.

"European Search Report", European Patent Application No. 17156337. 2, Applicant: Covidien LP, Aug. 23, 2017, 10 bages.

"International Search Report and Written Opinion", International Application No. PCT/US2021/015669, Apr. 12, 2021, 15 pages.

"International Search Report and Written Opinion", International Application No. PCT/US2018/060648, Jan. 28, 2019, 17 pages.

"International Search Report and Written Opinion", International Application No. PCT/US2018/065492, Mar. 8, 2019, 12 pages.

"International Search Report and Written Opinion", International Application No. PCT/US19/035433, Nov. 11, 2019, 17 pages.

"International Search Report and Written Opinion", International Application No. PCT/US2019/045600, Oct. 23, 2019, 19 pages.

"Invitation to Pay Additional Fees and Partial International Search Report", International Application No. PCT/US2019/035433, Sep. 13, 2019, 16 pages.

"Medical Electrical Equipment, Part 2-61: Particular requirements for basic safety and essential performance of pulse oximeter equipment", BSI Standards Publication, BS EN ISO 80601-2-61, 2011, 98 pages.

Aarts, Lonneke A.M., et al., "Non-contact heart rate monitoring utilizing camera photoplethysmography in neonatal Intensive care unit- A Pilot Study", Early Human Development 89, 2013, pp. 943-948, 6 pages.

Abbas, A.K., et al., "Neonatal non-contact respiratory monitoring based on real-time infrared thermography", Biomed. Eng. Online, vol. 10, No. 93, 2011, 17 pages.

Addison, Paul S., "A Review of Signal Processing Used in the Implementation of the Pulse Oximetry Photoplethysmographic Fluid Responsiveness Parameter", International Anesthesia Research Society, vol. 119, No. 6, Dec. 2014, pp. 1293-1306, 14 pages.

Addison, Paul S., et al., "Developing an algorithm for pulse oximetry derived respirator rate (RRoxi): a healthy volunteer study", J Clin comput, No. 26, 2012, pp. 45-51, 7 pages.

Addison, Paul S., et al., "Pulse oximetry-derived respiratory rate in general care floor patients", J. Clin Monit Comput, No. 29, 2015, pp. 113-120, 8 pages.

Addison, P.S., et al., "Video-based Heart Rate Monitoring across a Range of Skin Pigmentations during an Acute Hypoxic Challenge", J Clin Monit Comput, vol. 9, Nov. 9, 2017, 15 pages.

Amazon, "Dockem Koala Tablet Wall Mount Dock for ipad Air/Mini/Pro, Samsung Galaxy Tab/Note, Nexus 7/10, and More (Black Brackets, Screw-in Version)", https://www.amazon.com/Tablet-Dockem-Samsung-Brackets-Version-dp/B00JV75FC6?th=1, First available Apr. 22, 2014, viewed on Nov. 16, 2021, Apr. 22, 2014, 4 pages.

Amelard, et al., "Non-contact transmittance photoplethysmographic imaging (PPGI) for long-distance cardiovascular monitoring", ResearchGate, XP055542534 [Retrieved online Jan. 15, 2019], Mar. 23, 2015, pp. 1-13, 14 pages.

Armanian, A. M., "Caffeine administration to prevent apnea in very premature infants", Pediatrics & Neonatology, 57 (5), 2016, pp. 408-412, 5 pages.

Barone, S, et al., "Computer-aided modelling of three-dimensional maxillofacial tissues through multi-modal Imaging", Proceedings of the Institution of Mechanical Engineers, Journal of Engineering in Medicine, Part H vol. 227, No. 2, Feb. 1, 2013, 1 page.

Barone, S, et al., "Creation of 3D Multi-body Orthodontic Models by Using Independent Imaging Sensors", Senros MDPI AG Switzerland, vol. 13, No. 2, Jan. 1, 2013, pp. 2033-2050, 18 pages.

Bartula, M., et al., "Camera-based System for Sontactless Monitoring of Respiration", 2013 35th Annual International Conference of the IEEE Engineering in Medicine and Biology Society (EMBC), Jul. 3, 2013, pp. 2672-2675, 4 pages.

Bhattacharya, S., et al., "A Novel Classification Method for Predicting Acute Hypotensive Episodes in Critical Care", 5th ACM Conference on Bioinformatics, Computational Bilogy and Health Informatics (ACM-BCB 2014), Newport Beach, USA, 2014, 10 pages.

(56) References Cited

OTHER PUBLICATIONS

Bhattacharya, S., et al., "Unsupervised learning using Gaussian Mixture Copula models", 21st International Conference on Computational Statistics (COMPSTAT 2014), Geneva, Switzerland, 2014, pp. 523-530, 8 pages.

Bickler, Philip E., et al., "Factors Affecting the Performance of 5 Cerebral Oximeters During Hypoxia in Healthy Volunteers", Society for Technology in Anesthesia, vol. 117, No. 4, Oct. 2013, pp. 813-823, 11 pages.

Bousefsaf, Frederic, et al., "Continuous wavelet filtering on webcam photoplethysmographic signals to remotely assess the instantaneous heart rate", Biomedical Signal Processing and Control 8, 2013, pp. 568-574, 7 pages.

Bruser, C., et al., "Adaptive Beat-to-Beat Heart Rate Estimation in Ballistocardiograms", IEEE Transactions Information Technology in Biomedicine, vol. 15, No. 5, Sep. 2011, pp. 778-786, 9 pages.

Cennini, Giovanni, et al., "Heart rate monitoring via remote photoplethysmography with motion artifacts reduction", Optics Express, vol. 18, No. 5, Mar. 1, 2010, pp. 4867-4875, 9 pages.

Colantonio, S., et al., "A smart mirror to promote a healthy lifestyle", Biosystems Engineering. Vol. 138, Innovations in Medicine and Healthcare, Oct. 2015, pp. 33-43, 11 pages.

Cooley, et al., "An Alorithm for the Machine Calculation of Complex Fourier Series", Aug. 17, 1964, pp. 297-301, 5 pages.

Di Fiore, J.M., et al., "Intermittent hypoxemia and oxidative stress in preterm infants", Respiratory Physiology & Neurobiology, No. 266, 2019, pp. 121-129, 25 pages.

Fei, J., et al., "Thermistor at a distance: unobtrusive measurement of breathing", IEEE Transactions on Biomedical Engineering, vol. 57, No. 4, 2010, pp. 968-998, 11 pages.

Feng, Litong, et al., "Dynamic ROI based on K-means for remote photoplethysmography", IEE International Conference on Accoustics, Speech and Signal Processing (ICASSP), Apr. 2015, pp. 1310-1314, 5 pages.

Fischer, et al., "ReMoteCare: Health Monitoring with Streaming Video", OCMB '08, 7th International Conference on Mobile Business, IEEE, Piscataway, NJ,, Jul. 7, 2008, pp. 280-286.

George, et al., "Respiratory Rate Measurement From PPG Signal Using Smart Fusion Technique", International Conference on Engineering Trends and Science & Humanities (ICETSH-2015), 2015, 5 pages.

Goldman, L.J., "Nasal airflow and thoracoabdominal motion in children using infrared thermographic video processing", Pediatric Pulmonology, vol. 47, No. 5, 2012, pp. 476-486, 11 pages.

Grimm, T., et al., "Sleep position classification from a depth camera using bed aligned maps", 23rd International Conference on Pattern Recognition (ICPR), Dec. 2016, pp. 319-324, 6 pages.

Gsmarena, "Apple iPad Pro 11 (2018)", https://www.gsmarena.com/apple_ipad_pro_11_(2018)-9386.pjp, viewed on Nov. 16, 2021, 1 page.

Guazzi, Alessandro R., et al., "Non-contact measurement of oxygen saturation with an RGB camera", Biomedical Optics Express, vol. 6, No. 9, Sep. 1, 2015, pp. 3320-3338, 19 pages.

Han, J., et al., "Visible and infrared image registration in man-made environments employing hybrid visuals features", Pattern Recognition Letters, vol. 34, No. 1, 2013, pp. 42-51, 10 pages.

Huddar, V., et al., "Predicting Postoperative Acute Respiratory Failure in Critical Care using Nursing Notes and Physiological Signals", 36th Annual International Conference of IEEE Engineering in Medicine and Biology Society (IEEE EMBC 2014), Chicago, USA, 2014, pp. 2702-2705, 4 pages.

Hyvarinen, A., et al., "Independent Component Analysis: Algorithms and Applications", Neural Networks, vol. 13, No. 4, 2000, pp. 411-430, 31 pages.

Javadi, M., et al., "Diagnosing Pneumonia in Rural Thailand: Digital Cameras versus Film Digitizers for Chest Radiograph Teleradiology", International Journal of Infectious Disease, 10(2), Mar. 2006, pp. 129-135, 7 pages.

Jopling, M. W., et al., "Issues in the Laboratory Evaluation of Pulse Oximeter Performance", Anesth. Analg., No. 94, 2002, pp. S62-S68, 7 pages.

Kastle, Siegfried W., et al., "Determining the Artifact Sensitivity of Recent Pulse Oximeters During Laboratory Benchmarking", Journal of Clinical Monitoring and Computing, vol. 16, No. 7, 2000, pp. 509-552, 14 pages.

Klaessens, J.H.G.M., et al., "Non-invasive skin oxygenation imaging using a multi-spectral camera system: Effectiveness of various concentration algorithms applied on human skin", Proc. of SPIE, vol. 7174 717408-1, 2009, 14 pages.

Kong, Lingqin, et al., "Non-contact detection of oxygen saturation based on visible light imaging device using ambient light", Optics Express, vol. 21, No. 15, Jul. 29, 2013, pp. 17646-17471, 8 pages.

Kortelainen, J.M., et al., "Sleep staging based on signals acquired through bed sensor", IEEE Transactions on Informational Technology in Biomedicine, vol. 14, No. 3, May 2010, pp. 776-785, 10 pages.

Kumar, M., et al., "Distance PPG: Robust non-contact vital signs monitoring using a camera", Biomedical Optics Express, vol. 6, No. 5, May 1, 2015, 24 pages.

Kwon, Sungjun, et al., "Validation of heart rate extraction using video imaging on a built-in camera system of a smartphone", 34th Annual International Conference of the IEEE EMBS, San Diego, CA, USA, Aug. 28-Sep. 1, 2012, pp. 2174-2177, 4 pages.

Lai, C.J., et al., "Heated humidified high-flow nasal oxygen prevents intraoperative body temperature decrease in non-intubated thoracoscopy", Journal of Anesthesia, Oct. 15, 2018, 8 pages.

Rezaei, Mahdi, et al., "DeepSOCIAL: Social Distancing Monitoring and Infection Risk Assessment in COVID-19 Pandemic", Applied Sciences, vol. 10, 7514, Oct. 26, 2020, pp. 1-29, 29 pages.

Sathyamoorthy, Adarsh Jagan, et al., "COVID-Robot: Monitoring Social Distancing Constraints in Crowded Scenarios", Aug. 21, 2020, pp. 1-11, 11 pages.

Liu, X., et al., "An Image Captioning Method for Infant Sleeping Environment Diagnosis", Springer International Publishing, May 15, 2019, pp. 18-26, 9 pages.

Al-Naji, Ali, et al., "Real Time Apnoea Monitoring of Children Using the Microsoft Kinect Sensor: A Pilot Study", Sensors, 17(286), Feb. 3, 2017, 15 pages.

Harte, James M., et al., "Chest wall motion analysis in healthy volunteers and adults with cystic fibrosis using a novel Kinect-based motion tracking system", Medical & Biological Engineering & Computing, 54(11), Feb. 13, 2016, pp. 1631-1640, 11 pages.

Lawrence, E., et al., "Data Collection, Correlation and Dissemination of Medical Sensor information in a WSN", IEEE 2009 Fifth International Conference on Networking and Services, 978-0-7695-3586-9/09, Apr. 20, 2009, pp. 402-408, 7 pages.

Li, et al., "A Non-Contact Vision-Based System for Respiratory Rate Estimation", IEEE 978-1-4244-7929-0/14, 2014, pp. 2119-2122, 4 pages.

Liu, H., et al., "A Novel Method Based on Two Cameras for Accurate Estimation of Arterial Oxygen Saturation", BioMedical Engineering Online, vol. 14, No. 52, 2015, 18 pages.

Liu, S., et al., "In-bed pose estimation: Deep learning with shallow dataset. IEEE journal of translational engineering in health and medicine", IEEE Journal of Translational Engineering in Health and Medicine, No. 7, 2019, pp. 1-12, 12 pages.

Liu, C., et al., "Motion Magnification", ACM Transactions on Graphics (TOG), vol. 24, No. 3, 2005, pp. 519-526, 8 pages.

Lv, et al., "Class Energy Image Analysis for Video Sensor-Based Gait Recognition: A Review", Sensors, No. 15, 2015, pp. 932-964, 33 pages.

Mcduff, Daniel J., et al., "A Survey of Remote Optical Photoplethysmographic Imaging Methods", IEEE 987-1-4244-0270-1/15, 2015, pp. 6398-6404, 7 pages.

Mestha, L.K., et al., "Towards Continuous Monitoring of Pulse Rate in Neonatal Intensive Care Unit with a Webcam", Proc. of 36th Annual Int. Conf. of the IEEE Engineering in Medicine and Biology Society, Chicago, IL, 2014, pp. 3817-3820, 4 pages.

(56) References Cited

OTHER PUBLICATIONS

Mukherjee, S., et al., "Patient health management system using e-health monitoring architecture", IEEE, International Advance Computing Conference (IACC), 978-1-4799-2572-8/14, Feb. 21, 2014, pp. 400-405, 6 pages.

Nguyen, et al., "3D shape, deformation and vibration measurements using infrared Kinect sensors and digital image correlation", Applied Optics, vol. 56, No. 32, Nov. 10, 2017, 8 pages.

Ni, et al., "RGBD-Camera Based Get-Up Event Detection for Hospital Fall Prevention", Acoustics, Speech and Signal Processing (ICASSP) 2012 IEEE International Conf., Mar. 2012, pp. 1405-1408, 6 pages.

Nisar, et al., "Contactless heart rate monitor for multiple persons in a video", IEEE International Conference on Consumer Electronics-Taiwan (ICCE-TW), XP03291229 [Retreived on Jul. 25, 2016], May 27, 2016, 2 pages.

Pereira, C., et al., "Noncontact Monitoring of Respiratory Rate in Newborn Infants Using Thermal Imaging", IEEE Transactions on Biomedical Engineering, Aug. 23, 2018, 10 pages.

Poh, et al., "Advancements in Noncontact, Multiparameter Physiological Measurements Using a Webcam", IEEE Transactions on Biomedical Engineering, vol. 58, No. 1, Jan. 2011, pp. 7-11, 5 pages.

Poh, et al., "Non-contact, automated cardiac pulse measurements using video imaging and blind source separation", OPT. Express 18, 2010, pp. 10762-10774, 14 pages.

Povsic, Klemen, et al., "Real-Time 3D visualization of the thoraco-abdominal surface during breathing with body movement and deformation extraction", Physiological Measurement, vol. 36, No. 7, May 28, 2015, pp. 1497-1516, 22 pages.

Prochazka, et al., "Microsoft Kinect Visual and Depth Sensors for Breathing and Heart Rate Analysis", Senors, vol. 16, No. 7, Jun. 28, 2016, 11 pages.

Rajan, V., et al., "Clinical Decision Support for Stroke using Multiview Learning based Models for NIHSS Scores", PAKDD 2016 Workshop: Predictive Analytics in Critical Care (PACC), Auckland, New Zealand, 2016, pp. 190-199, 10 pages.

Rajan, V., et al., "Dependency Clustering of Mixed Data with Gaussian Mixture Copulas", 25th International Joint Conference on Artificial Intelligence IJCAI, New York, USA, 2016, pp. 1967-1973, 7 pages.

Reisner, A., et al., "Utility of the Photoplethysmogram in Circulatory Monitoring", American Society of Anesthesiologist, May 2008, pp. 950-958, 9 pages.

Reyes, B.A., et al., "Tidal Volume and Instantaneous Respiration Rate Estimation using a Volumetric Surrogate Signal Acquired via a Smartphone Camera", IEEE Journal of Biomedical and Health Informatics, vol. 21(3), Feb. 25, 2016, pp. 764-777, 15 pages.

Rougier, Caroline, et al., "Robust Video Surveillance for Fall Detection Based on Human Shape Deformation", IEEE Transactions on Circuits and Systems for Video Technology, vol. 21, No. 5, May 2011, pp. 611-622, 12 pages.

Rubinstein, M, "Analysis and Visualization of Temporal Variations in Video", Department of Electrical Engineering and Computer Science, Massachusetts Institute of Technology, Feb. 2014, 118 pages.

Scalise, Lorenzo, et al., "Heart rate measurement in neonatal patients using a webcamera", Department of Industrial Engineering and Mathematical Science, Italy, 978-1-4673-0882-3/12, EEE, 2012, 4 pages.

Schaerer, J., et al., "Multi-dimensional respiratory motion tracking from markerless optical surface imaging based pn deformable mesh registration", Physics in Medicine and Biology, vol. 57, No. 2, Dec. 14, 2011, pp. 357-373, 18 pages.

Sengupta, A., et al., "A Statistical Model for Stroke Outcome Prediction and Treatment Planning", 38th Annual International Conference of the IEE Engineering in Medicine and Biology (Society IEEE EMBC2016), Orlando, USA, 2016, pp. 2516-2519, 4 pages.

Shah, Nitin, et al., "Performance of three new-generation pulse oximeters during motion and low perfursion in volunteers", Journal of Clinical Anesthesia, No. 24, 2012, pp. 385-391, 7 pages.

Shao, Dangdang, et al., "Noncontact Monitoring Breathing Pattern, Exhalation Flow Rate and Pulse Transit Time", EEE Transactions on Biomedical Engineering, vol. 61, No. 11, Nov. 2014, pp. 2760-2767, 8 pages.

Shrivastava, H., et al., "Classification with Imbalance: A Similarity-based Method for Predicting Respiratory Failure", IEEE International Conference on Bioinformatics and Biomedicine (IEEE BIBM2015), Washington, DC,USA, 2015, pp. 707-714, 8 pages.

Srinivas, J., et al., "A Mutual Authentication Framework for Wireless Medical Sensor Networks", Journal of Medical Systems, 41:80, 2017, pp. 1-19, 19 pages.

Sun, Yu, et al., "Motion-compensated noncontact imaging photoplethysmography to monitor cardiorespiratory status during exercise", Journal of Biomedical Optics, vol. 16, No. 7, Jul. 1, 2011, 10 pages.

Sun, Yu, et al., "Noncontact imaging photoplethysmography to effectively access pulse rate variability", Journal of Biomedical Optics, vol. 18(6), Jun. 2013, 10 pages.

Tamura, et al., "Wearable Photoplethysmographic Sensors-Past & Present", Electronics, vol. 3, 2014, pp. 282-302, 21 pages.

Tarassenko, L., et al., "Non-contact video-based vital sign monitoring using ambient light and auto-regressive models", Institute of Physics and Engineering in Medicine, vol. 35, 2014, pp. 807-831, 26 pages.

Teichmann, D., et al., "Non-Contact monitoring techniques-Principles and applications", In Proc. of IEEE International Conference of the Engineering in Medicine and Biology Society (EMBC), San Diego, CA, 2012, pp. 1302-1305, 4 pages.

Transue, S., et al., "Real-time Tidal vol. Estimation using Iso-surface Reconstruction", 2016 IEEE First International Conference on Connected Health: Applications, Systems and Engineering Technologies (CHASE), Jun. 27, 2016, pp. 209-218, 10 pages.

Verkruysee, Wim, et al., "Calibration of Contactless Pulse Oximetry", Anesthesia & Analgesia, vol. 124, No. 1, Jan. 2017, pp. 136-145, 10 pages.

Villarroel, Mauricio, et al., "Continuous non-contact vital sign monitoring in neonatal intensive care unit", Healthcare Technology Letters, vol. 1, Issue 3, 2014, pp. 87-91, 5 pages.

Wadhwa, N., et al., "Phase-Based Video Motion Processing", MIT Computer Science and Artificial Intelligence Lab, Jul. 2013, 9 pages.

Wadhwa, N., et al., "Riesz pyramids for fast phase-based video magnification", In Proc. of IEEE International Conference on Computational Photography (ICCP), Santa Clara, CA, 2014, 10 pages.

Wang, W., et al., "Exploiting spatial redundancy of image sensor for motion robust rPPG", IEEE Transactions on Biomedical Engineering, vol. 62, No. 2, 2015, pp. 415-425, 11 pages.

Wu, H.Y., et al., "Eulerian video magnifcation for revealing subtle changes in the world", ACM Transactions on Graphics (TOG), vol. 31, No. 4, 2012, pp. 651-658, 8 pages.

Wulbrand, H., et al., "Submental and diaphragmatic muscle activity during and at resolution of mixed and obstructive apneas and cardiorespiratory arousal in preterm infants", Pediatric Research, No. 38(3), 1995, pp. 298-305, 9 pages.

Yu, M.C., et al., "Noncontact Respiratory Measurement of Volume Change Using Depth Camera", 2012 Annual International Conference of the IEEE Engeineering in Medicine and Biology Society, Aug. 28, 2012, pp. 2371-2374, 4 pages.

Zaunseder, et al., "Spatio-temporal analysis of blood perfusion by imaging photoplethysmography", Progress in Biomedical Optics and Imaging, SPIE-International Society for Optical Engineering, vol. 10501, Feb. 20, 2018, 15 pages.

Zhou, J., et al., "Maximum parsimony analysis of gene copy number changes in tumor phylogenetics", 15th International Workshop on Algorithms in Bioinformatics WABI 2015, Atlanta, USA, 2015, pp. 108-120, 13 pages.

(56) References Cited

OTHER PUBLICATIONS

Sokooti, Hess, et al., "Hierarchical Prediction of Registration Misalignment Using a Convolutional LSTM: Application to Chest CT Scans", IEEE Access, IEEE, USA, vol. 9, Apr. 20, 2021, 62008-62020, 13 pages.

* cited by examiner

ENHANCED IMAGE FOR NON-CONTACT MONITORING

CROSS-REFERENCE TO RELATED APPLICATIONS

The present application claims benefit of priority to U.S. Provisional Patent Application No. 63/253,953, entitled "ENHANCED IMAGE FOR NON-CONTACT MONITORING" and filed on Oct. 8, 2021, and U.S. Provisional Patent Application No. 63/257,251, entitled "ENHANCED IMAGE FOR NON-CONTACT MONITORING" and filed on Oct. 19, 2021, which are specifically incorporated by reference herein for all that they disclose or teach.

BACKGROUND

Video-based monitoring is a field of patient monitoring that uses a remote video camera to detect physical attributes of the patient, such as respiratory parameters including respiration rate, tidal volume, minute volume, oxygen saturation, effort to breathe, etc., and other patient parameters such as motion and activity, temperature, pulse/heart rate, etc. This type of monitoring may also be called "non-contact" monitoring in reference to the remote video sensor, which does not contact the patient. Many of these parameters are detected and monitored by knowing the distance or depth between the patient surface and a depth sensing camera.

One thing many of these systems have in common is that an image of the patient is provided on a video display and a visual representation of the parameter being monitored is also seen on the display, often overlaid onto the patient image. What is desired is a clear patient image with clear distinction of the patient from the background.

SUMMARY

The present disclosure is directed to methods for enhancing the image of a subject, such as a patient, in a video non-contact monitoring system to provide a clear image with clear distinction of the subject from the background. The methods include applying a histogram equalization transform, such as a contrast limited adaptive histogram equalization (CLAHE) transform, to the depth data obtained from a camera of the monitoring system. In some embodiments, the enhanced image of the subject is merged with an overlay image of a monitored physiological parameter determined by the non-contact patient monitoring system.

One particular embodiment described herein is a method that includes receiving a video signal having depth data from a non-contact patient monitoring system, enhancing a contrast of the depth data, and applying a colormap to the enhanced contrast depth data to obtain an enhanced image.

Another particular embodiment described herein is a method that includes receiving a video signal having depth data from a non-contact patient monitoring system, extracting a perceptual lightness channel from the video signal, enhancing the contrast of the perceptual lightness channel, merging the perceptual lightness channel back with the channels to obtain an enhanced image, determining an overlay of a monitored physiological parameter by the non-contact patient monitoring system, and merging the enhanced image with the overlay.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other embodiments are also described and recited herein.

DETAILED DESCRIPTION

Figure 1:
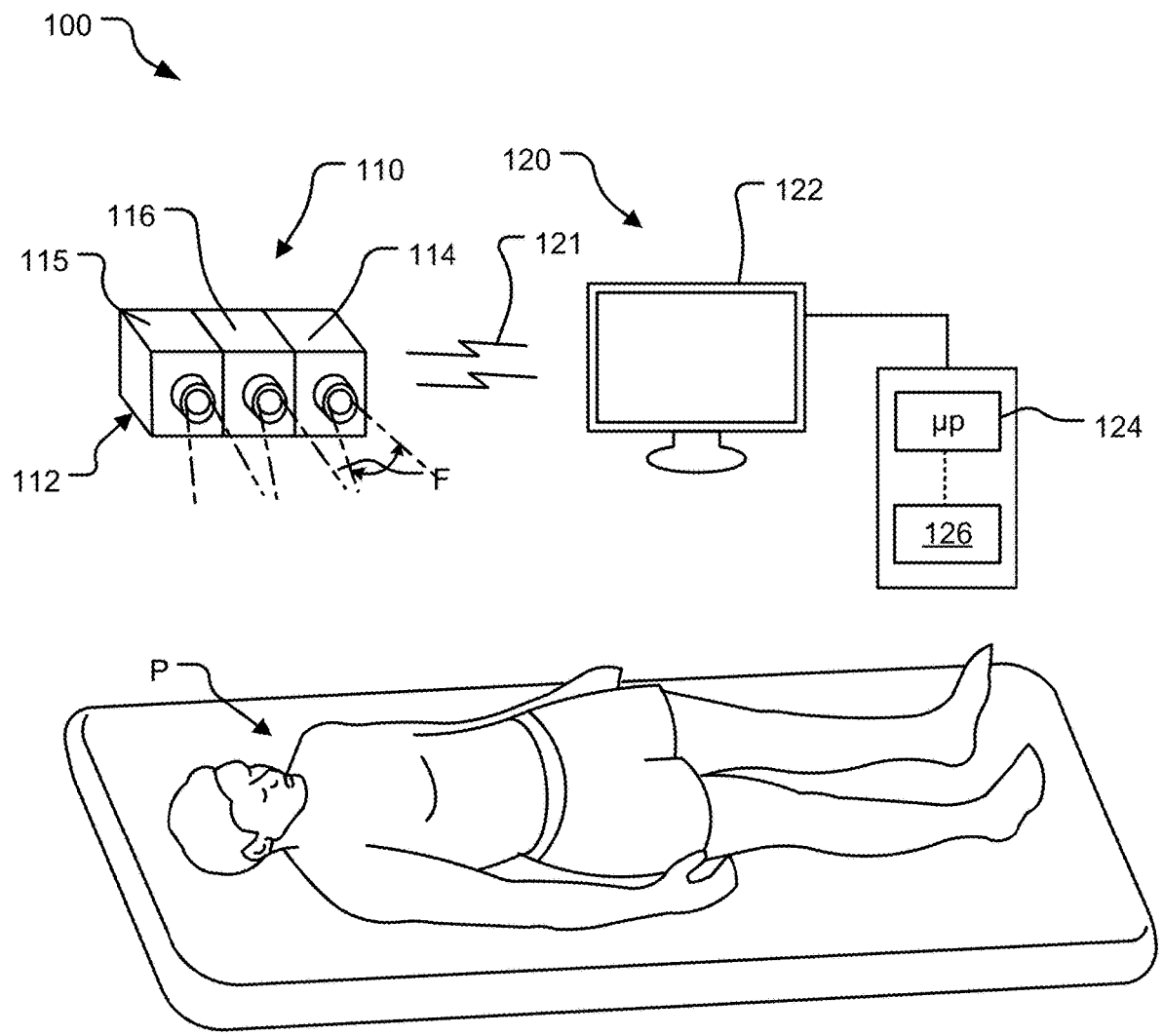
FIG. 1 is a schematic diagram of an example non-contact patient monitoring system according to various embodiments described herein.

The present disclosure is directed to medical monitoring of a patient, and in particular, non-contact, video-based monitoring of a patient. Systems and methods are described for receiving a video signal view of a patient, identifying a physiologically relevant area within the video image (such as a patient's forehead or chest), extracting a distance or depth signal from the relevant area, and manipulating the depth data to provide a visual image on a display that is more clear than an image prepared from unmanipulated depth data.

The depth data are detected by a camera or camera system that views but does not contact the patient. With appropriate selection of the data from the signals detected by the camera, a visual image of the patient can be presented with a physiologic parameter of the patient shown in the image. With additional appropriate selection and manipulation of the data, according to the methods herein, the visual image is enhanced, providing an enhanced and more clear image.

Non-contact or remote monitoring, such as video-based monitoring, can deliver significant benefits over contact monitoring. Some video-based monitoring can reduce cost and waste by reducing use of disposable contact sensors, replacing them with reusable camera systems. Video monitoring may also reduce the spread of infection, by reducing physical contact between caregivers and patients. Video cameras can improve patient mobility and comfort, by freeing patients from wired tethers or bulky wearable sensors. In some cases, these systems can also save time for caregivers, who no longer need to reposition, clean, inspect, or replace contact sensors.

One challenge with video monitoring is motion or movement of the patient. Movement in non-contact monitoring creates various complications, due to the extent of movement possible between the patient and the camera. Because the camera is remote from the patient, the patient may move toward or away from the camera, creating a moving frame of reference, or may rotate with respect to the camera, effectively morphing the region that is being monitored. Thus, the monitored tissue can change morphology within the image frame over time.

Another challenge with video monitoring is that the depth data signal received from the camera is, at times, insufficient to provide a clear visual image (e.g., on a display) of the region being monitored. For example, it may be difficult for the viewer of the display to differentiate, e.g., the patient's head from the pillow from the bed. This may be caused by, e.g., motion noise or other data or signal noise.

The present disclosure describes methods for enhancing the visual distinction of the patient and/or the background for non-contact monitoring of a patient to determine physiological parameter(s) such as respiration rate, tidal volume, minute volume, oxygen saturation, temperature, pulse/heart rate, motion and activity, etc. The systems and methods receive a video signal from the patient and from that extract distance or depth data from the relevant area and then manipulate the data to provide an enhanced image.

The depth sensing feature provides a measurement of the distance or depth between the detection system and the patient. One or two video cameras may be used to determine the depth, and change in depth, from the system to the patient. When two cameras, set at a fixed distance apart, are used, they offer stereo vision due to the slightly different perspectives of the scene from which distance information is extracted. When distinct features are present in the scene, the stereo image algorithm can find the locations of the same features in the two image streams. However, if an object is featureless (e.g., a smooth surface with a monochromatic color), then the depth camera system has difficulty resolving the perspective differences. By including an image projector to project features (e.g., in the form of dots, pixels, etc.) onto the scene, this projected feature can be monitored over time to produce an estimate of changing distance or depth.

In the following description, reference is made to the accompanying drawing that forms a part hereof and in which is shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 shows a non-contact patient monitoring system 100 and a patient P. The system 100 includes a non-contact detector system 110 placed remote from the patient P. In this embodiment, the detector system 110 includes a camera system 112, particularly, that includes an infrared (IR) detection feature. The camera system 112 includes a first camera 114 and a second camera 115, at least one of which is a depth sensing camera, such as a Kinect camera from Microsoft Corp. (Redmond, Washington) or a RealSense™ D415, D435 or D455 camera from Intel Corp. (Santa Clara, California).

The cameras 114, 115 are positioned so that their ROI at least intersect, in some embodiments overlap. The detector system 110 also includes an IR projector 116, which projects individual features (e.g., dots, crosses or Xs, lines, or a featureless pattern, or a combination thereof etc.) onto the ROI. The projector 116 can be separate from the camera system 112 or integral with the camera system 112, as shown in FIG. 1. In some embodiments, more than one projector 116 can be used. Both cameras 114, 115 and the projector 116 are aimed to have the features projected by the projector 116 to be in the ROI.

The cameras 114, 115 and projector 116 are remote from the patient P, in that they are spaced apart from and do not contact the patient P. The camera system 112 includes a detector exposed to a field of view F that encompasses at least a portion of the patient P.

The camera system 112 includes at least one depth sensing camera, either or both camera 114 or camera 115, that can detect a distance between the camera system 112 and objects in its field of view F. Such information can be used to determine that a patient is within the field of view of the camera system 112 and determine a region of interest (ROI) to monitor on the patient. Once an ROI is identified, that ROI can be monitored over time, and the change in depth of points within the ROI can represent movements of the patient associated with, e.g., breathing. Accordingly, those movements, or changes of depth points within the ROI, can be used to determine, e.g., respiration rate, tidal volume, minute volume, effort to breathe, etc.

In some embodiments, the field of view F encompasses exposed skin of the patient. In other embodiments, the field of view F encompasses a portion of the patient's torso, covered by a blanket, sheet, or gown.

The cameras 114, 115 operate at a frame rate, which is the number of image frames taken per second (or other time period). Example frame rates include 15, 20, 30, 40, 50, or 60 frames per second, greater than 60 frames per second, or other values between those. Frame rates of 20-30 frames per second produce useful signals, though frame rates above 100 or 120 frames per second are helpful in avoiding aliasing with light flicker (for artificial lights having frequencies around 50 or 60 Hz).

The distance from the ROI on the patient P to the camera system 112 is measured by the system 100. Generally, the camera system 112 detects a distance between the camera system 112 and the projected features on the surface of the patient P within the ROI; the change in depth or distance of the ROI represents movements of the patient P, e.g., associated with breathing. The light from the projector 116 hitting the surface is scattered/diffused in all directions and is monitored by the camera system 112 to determine the distance; the diffusion pattern depends on the reflective and scattering properties of the surface. The camera system 112 also detects the light intensity of the projected individual features in their ROIs. From the distance and the light intensity, at least one physiological parameter of the patient P is monitored. Additional details are provided below in respect to FIG. 2A and FIG. 2B.

Different methods can be used to identify the patient and define an ROI. In some embodiments, the system 100 determines a skeleton outline of the patient P to identify a point or points from which to extrapolate the ROI. For example, a skeleton may be used to find a center point of a chest, shoulder points, waist points, and/or any other points on a body. These points can be used to determine the ROI. For example, the ROI may be defined by filling in the area around a center point of the chest. Certain determined points may define an outer edge of an ROI, such as shoulder points. In other embodiments, instead of using a skeleton, other points are used to establish an ROI. For example, a face may be recognized, and a chest area inferred in proportion and spatial relation to the face. In other embodiments, the system 100 may establish the ROI around a point based on which parts are within a certain depth range of the point. In other words, once a point is determined that an ROI should be developed from, the system can utilize the depth information from the depth sensing camera system 112 to fill out the ROI as disclosed herein. For example, if a point on the chest is selected, depth information is utilized to determine the ROI area around the determined point that is a similar distance from the depth sensing camera 114 as the determined point. This area is likely to be a chest.

The ROI size may differ according to the distance of the patient from the camera system. The ROI dimensions may vary linearly with the distance of the patient from the camera system. This ensures that the ROI scales according with the patient and covers the same part of the patient regardless of the patient's distance from the camera. This is accomplished by applying a scaling factor that is dependent on the distance of the patient (and the ROI) from the camera. In order to properly measure the depth changes, the actual size (area) of the ROI is determined and movements of that ROI are measured. The measured movements of the ROI and the actual size of the ROI are then used to calculate a parameter, e.g., a tidal volume. Because a patient's distance from a camera can change, e.g., due to the patient's rolling or position readjustment, the ROI associated with that patient can appear to change in size in an image from a camera. However, using the depth sensing information captured by a depth sensing camera or other type of depth sensor, the system can determine how far away from the camera the patient (and their ROI) actually is. With this information, the actual size of the ROI can be determined, allowing for accurate measurements of depth change regardless of the distance of the camera to the patient.

In some embodiments, the system 100 may receive a user input to identify a starting point for defining an ROI. For example, an image may be reproduced on an interface, allowing a user of the interface to select a patient for monitoring (which may be helpful where multiple humans are in view of a camera) and/or allowing the user to select a point on the patient from which the ROI can be determined (such as a point on the chest). Other methods for identifying a patient, points on the patient, and defining an ROI may also be used.

To determine the distance from the camera system 112 and the projected image on the patient P, the detected images and diffusion measurements (detected by the camera system 112) are sent to a computing device 120 through a wired or wireless connection 121. The computing device 120 includes a display 122, a processor 124, and hardware memory 126 for storing software and computer instructions. Sequential image frames of the patient P are recorded by the video camera system 112 and sent to the processor 124 for analysis. The display 122 may be remote from the camera system 112, such as a video screen positioned separately from the processor and memory. Other embodiments of the computing device 120 may have different, fewer, or additional components than shown in FIG. 1. In some embodiments, the computing device may be a server. In other embodiments, the computing device of FIG. 1 may be additionally connected to a server. The captured images (e.g., still images, or video) can be processed or analyzed at the computing device and/or at the server to determine the parameters of the patient P as disclosed herein.

Figure 2A:
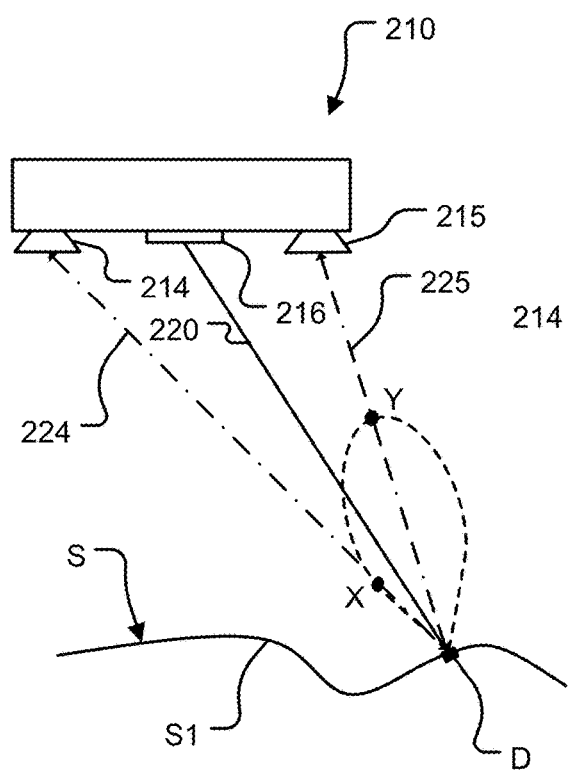
FIG. 2A and FIG. 2B are schematic diagrams showing two embodiments using the example non-contact patient monitoring system of FIG. 1.
Figure 2B:
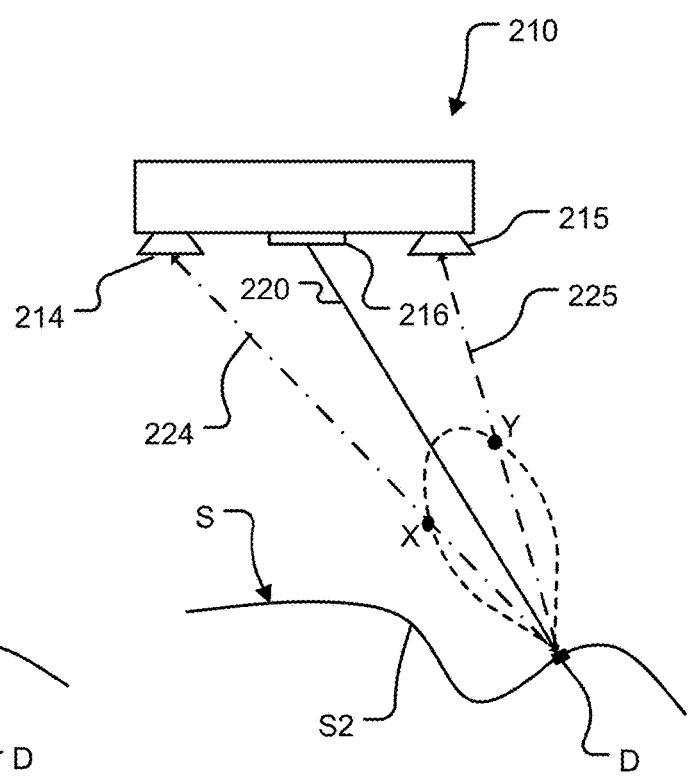

FIG. 2A and FIG. 2B both show a non-contact detector 210 having a first camera 214, a second camera 215, and an IR projector 216. A dot D is projected by the projector 216 onto a surface S, e.g., of a patient, via a beam 220. Light from the dot D is reflected by the surface S and is detected by the camera 214 as beam 224 and by the camera 215 as beam 225.

In a particular implementation, the light intensity returned to and observed by the cameras 214, 215 depends on the diffusion pattern caused by the surface S (e.g., the surface of a patient), the distance between the cameras 214, 215 and surface S, the surface gradient, and the orientation of the cameras 214, 215 relative to the surface S. In FIG. 2A, the surface S has a first profile S1 and in FIG. 2B, the surface S has a second profile S2 different than S1; as an example, the first profile S1 is during an exhale breath of a patient and the second profile S2 is during an inhale breath of the patient. Because the surface profiles S1 and S2 differ, the deflection pattern from the dot D on each of the surfaces differs for the two figures, and hence the distance from the cameras 214, 215 to the surface differs for the two figures.

During movement such as breathing, the light intensity reflection off the dot D observed by the cameras 214, 215 changes because the surface profile S1 and S2 (specifically, the gradient) changes as well as the distance between the surface S and the cameras 214, 215. FIG. 2A shows the surface S having the surface profile S1 at time instant $t=t_n$ and FIG. 2B shows the surface S having the surface profile S2 at a later time, specifically $t=t_{n+1}$, with S2 being slightly changed due to motion caused by respiration. Consequently, the intensity of the projected dot D observed by the cameras 214, 215 will changed due to the changes of the surface S. In FIG. 2A, a significantly greater intensity is measured by the camera 215 than the camera 214, seen by the x and y on the beams 224, 225, respectively. In FIG. 2B, y is less than y in FIG. 2A, whereas x in FIG. 2B is greater than x in FIG. 2A. The manner in how these intensities change depends on the diffusion pattern and its change over time, which are related to movement of the surface S. As seen in FIGS. 2A and 2B, the light intensities as measured by the cameras 214, 215 have changed between FIGS. 2A and 2B, and hence, the surface S has moved. Each camera will generate a signal because of the change of the intensity of dot D when the surface profile changes from time instant $t=t_n$ to $t=t_{n+1}$ due to movement.

In some other embodiments, a single camera and light projector can be used. For example, the camera 215 may be not present or is ignored. It is clear that the camera 214 will still produce a change in light intensity from time instant $t=t_n$ to $t=t_{n+1}$ due to movement. This embodiment will therefore produce only a single signal as opposed to the two signals generated by the embodiment discussed in the previous paragraph.

Alternatively, other depth camera detectors may be used for the monitoring system. For example, the depth camera detector and/or the depth camera(s) may be based on, for example, stereoscopic, structured light, or time-of-flight principles.

Stereoscopic depth cameras resolve depth by using two slightly different perspective views of the same scene, similar to the detector 210 of FIGS. 2A and 2B; this is similar to the manner in which frontal vision animals perceive depth. Algorithmically, the depth data is constructed from the two views by calculating the disparities between features or key points in the scene.

Structured light and related coded light-based cameras project a pattern (e.g., an IR pattern) onto a scene; the pattern, which may be a series of stripes or dots, for example, has a known visual shape. Depth data is obtained by analyzing the deformation of the shape perceived by the camera, the deformation due to the movement of the scene. This detected movement is correlated to the distance from the cameras to the deformed pattern on the scene.

Depth cameras operate on the time-of-flight principle and measure distance (depth) to points in the scene by measuring the time it takes for a signal emitted from the camera to return due to reflection from a surface. The scene is actively illuminated by the camera's emitter (e.g., a radiation emitter, such as an IR laser) and the camera recovers the distance information either through a direct (i.e., half the return time) or indirect (i.e., phase recovery of a modulated emitted signal) method.

In addition to the methods and cameras/detectors described above, any suitable method for determining depth data from a scene can be used in the methods described herein.

Figure 3:
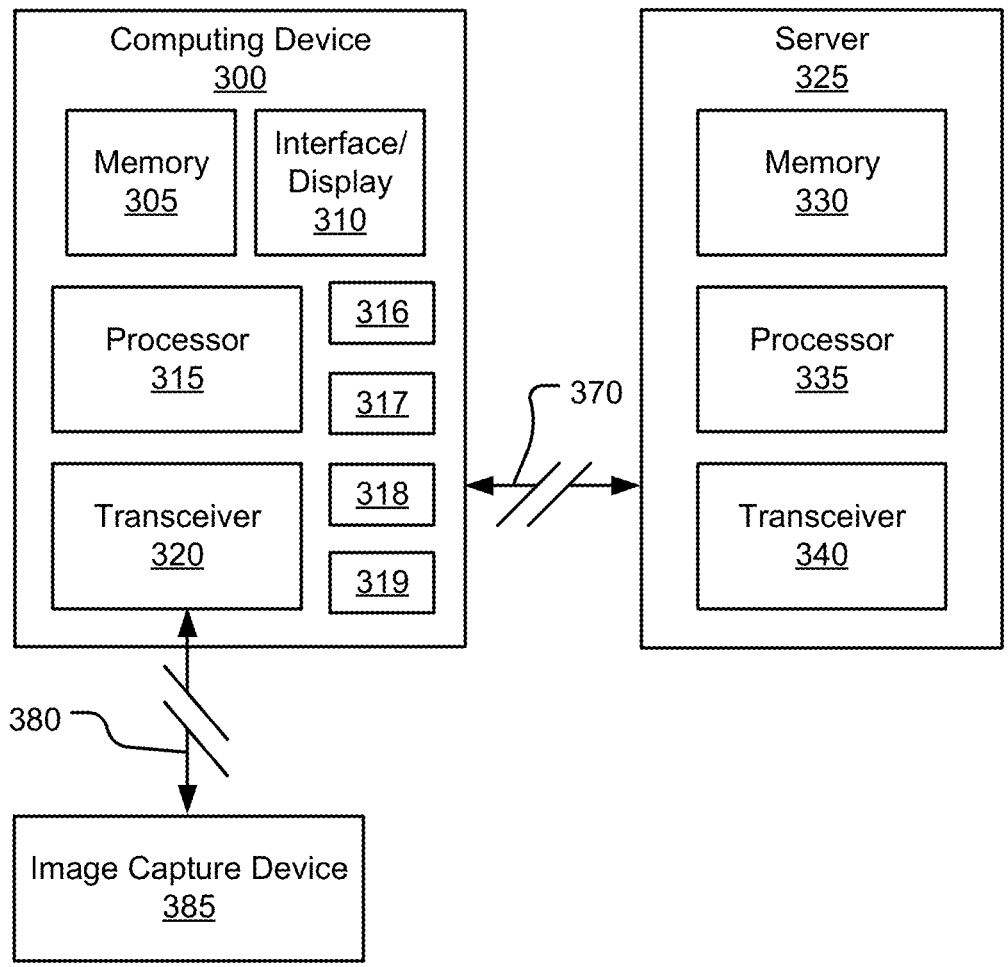
FIG. 3 is a block diagram of a computing device, a server, and an image capture device according to various embodiments described herein.

FIG. 3 is a block diagram illustrating a system including a computing device 300, a server 325, and an image capture device 385 (e.g., a camera, e.g., the camera system 112 or cameras 114, 115). In various embodiments, fewer, additional and/or different components may be used in the system.

The computing device 300 includes a processor 315 that is coupled to a memory 305 to store and recall data and applications in the memory 305, including applications that process information and send commands/signals according to any of the methods disclosed herein. The computing device 300 includes, in this example, modules 316, 317, 318 and 319, each configured to execute one or more of the analytical methods for manipulating the depth data described below to determine the enhanced image.

The processor 315 may also display objects, applications, data, etc. on an interface/display 310. The processor 315 may also or alternately receive inputs through the interface/display 310. The processor 315 is also coupled to a transceiver 320. With this configuration, the processor 315, and subsequently the computing device 300, can communicate with other devices, such as the server 325 through a connection 370 and the image capture device 385 through a connection 380. For example, the computing device 300 may send to the server 325 information determined about a patient from images captured by the image capture device 385, such as depth information of a patient in an image.

The server 325 also includes a processor 335 that is coupled to a memory 330 and to a transceiver 340. The processor 335 can store and recall data and applications in the memory 330. In some implementations, the server 325 may include the modules for manipulating the depth data, rather than the computing device 300. With this configuration, the processor 335, and subsequently the server 325, can communicate with other devices, such as the computing device 300 through the connection 370.

The computing device 300 may be, e.g., the computing device 120 of FIG. 1. Accordingly, the computing device 300 may be located remotely from the image capture device 385, or it may be local and close to the image capture device 385 (e.g., in the same room). The processor 315 of the computing device 300 may perform any or all of the various steps disclosed herein. In other embodiments, the steps may be performed on a processor 335 of the server 325. In some embodiments, the various steps and methods disclosed herein may be performed by both of the processors 315 and 335. In some other embodiments, certain steps may be performed by the processor 315 while others are performed by the processor 335. Information determined by the processor 315 may be sent to the server 325 for storage and/or further processing.

The devices may be utilized in various ways. For example, either or both of the connections 370, 380 may be varied. For example, either or both the connections 370, 380 may be a hard-wired connection. A hard-wired connection may involve connecting the devices through a USB (universal serial bus) port, serial port, parallel port, or other type of wired connection to facilitate the transfer of data and information between a processor of a device and a second processor of a second device. In another example, one or both of the connections 370, 380 may be a dock where one device may plug into another device. As another example, one or both of the connections 370, 380 may be a wireless connection. These connections may be any sort of wireless connection, including, but not limited to, Bluetooth connectivity, Wi-Fi connectivity, infrared, visible light, radio frequency (RF) signals, or other wireless protocols/methods. For example, other possible modes of wireless communication may include near-field communications, such as passive radio-frequency identification (RFID) and active RFID technologies. RFID and similar near-field communications may allow the various devices to communicate in short range when they are placed proximate to one another. In yet another example, the various devices may connect through an internet (or other network) connection. That is, one or both of the connections 370, 380 may represent several different computing devices and network components that allow the various devices to communicate through the internet, either through a hard-wired or wireless connection. One or both of the connections 370, 380 may also be a combination of several modes of connection.

The configuration of the devices in FIG. 3 is merely one physical system on which the disclosed embodiments may be executed. Other configurations of the devices shown may exist to practice the disclosed embodiments as well as configurations of additional or fewer devices than the ones shown in FIG. 3. Additionally, any of the devices shown in FIG. 3 may be combined to allow for fewer devices than shown or separated such that more than the three devices exist in a system. It will be appreciated that many various combinations of computing devices may execute the methods and systems disclosed herein. Examples of such computing devices may include other types of medical devices and sensors, infrared cameras/detectors, night vision cameras/detectors, other types of cameras, radio frequency transmitters/receivers, smart phones, personal computers, servers, laptop computers, tablets, RFID enabled devices, or any combinations of such devices.

The methods of this disclosure utilizes depth (distance) data between the camera(s) and the patient to produce a visual image of the patient and the background, the image being produced by applying a histogram equalization transform to the depth data.

A depth image or depth map, which includes information about the distance from the camera(s) to each point in the image, can be measured or otherwise captured by a depth sensing camera, such as a Kinect camera from Microsoft Corp. (Redmond, Washington) or a RealSense™ D415, D435 or D455 camera from Intel Corp. (Santa Clara, California) or other sensor devices based upon, for example, millimeter wave and acoustic principles to measure distance. The depth image or map can be obtained by a stereo camera, a camera cluster, camera array, or a motion sensor focused on a ROI, such as a patient's chest. In some embodiments, the camera(s) are focused on visible or IR features in the ROI. Each projected feature may be monitored, less than all the features in the ROI may be monitored or all the pixels in the ROI can be monitored.

Because the image includes depth data or a depth map from the depth sensing camera(s), information on the spatial location of the patient (e.g., the patient's chest) in the ROI can be determined. For example, as the patient breathes, the patient's chest moves toward and away from the camera, changing the depth information associated with the images over time. As a result, the location information associated with the ROI changes over time. For example, movement of a patient's chest toward the camera as the patient's chest expands forward represents inhalation. Similarly, movement backward, away from the camera, occurs when the patient's chest contracts with exhalation. This movement forward and backward can be tracked to determine a respiration rate.

The non-contact monitoring system (e.g., system 100 of FIG. 1) utilizes the display (e.g., display 122 of FIG. 1) to provide an image of the patient to the viewer overlayed with the monitored physiological parameter, e.g., respiration rate. If the depth data or depth map is displayed in a generally-unaltered format, the image can be fairly grainy and nondescript, with the patient often not distinguishable from the background. By applying a histogram equalization (HE) transform, such as a contrast limited adaptive histogram equalization (CLAHE) transform, to the depth data, the resulting image has better contrast so that the patient and details can be better viewed, and the resulting image may have smoother transitions.

Figure 4A:
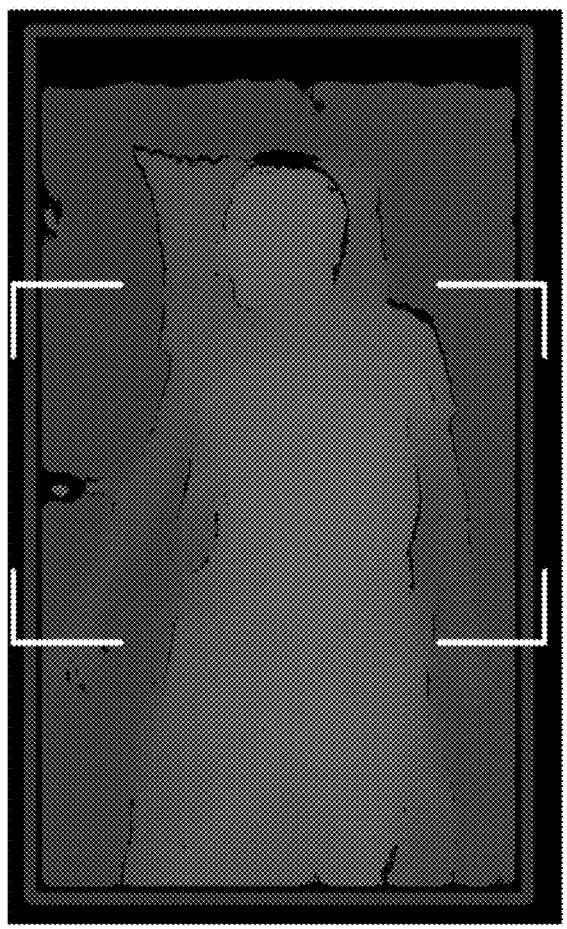
FIG. 4A is an image of a patient being monitored by a conventional non-contact patient monitoring system.
Figure 4B:
FIG. 4B is an image of the patient being monitored by the non-contact monitoring system including a background enhancement.
Figure 5A:
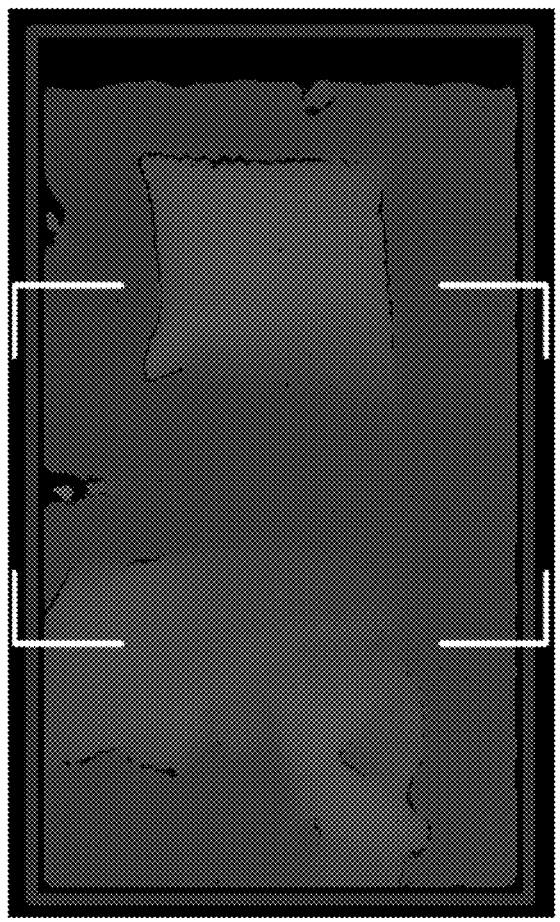
FIG. 5A is an image of a background being monitored by a conventional non-contact patient monitoring system.
Figure 5B:
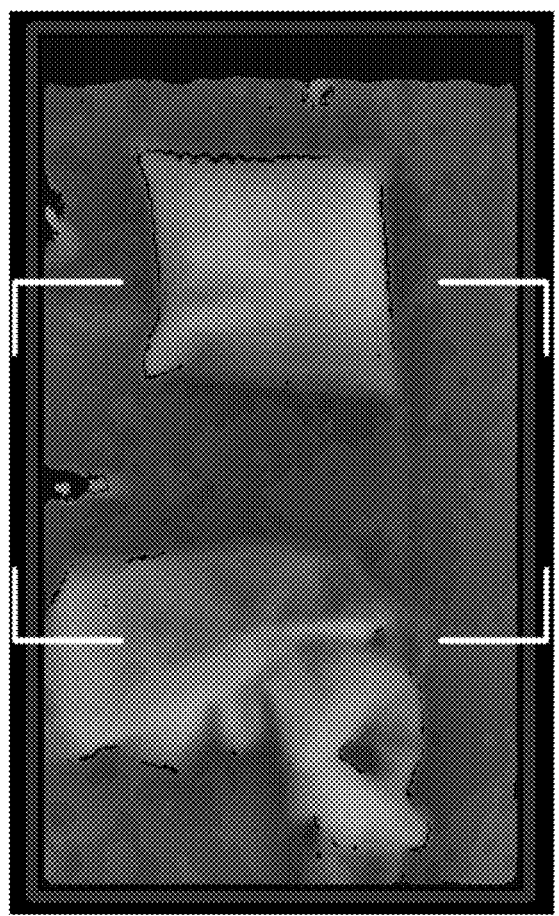
FIG. 5B is an image of the background being monitored by the non-contact monitoring system including a background enhancement.

FIGS. 4A and 4B and FIGS. 5A and 5B show the visual benefit obtained by applying the histogram equalization transform to the depth data. FIGS. 4A and 4B show a patient on a bed with a pillow, whereas FIGS. 5A and 5B show the bed with the pillow but with the patient no longer in the scene. In both FIGS. 4B and 5B, the enhanced images, as an example, the folds and wrinkles of the blanket can be readily identified.

In FIG. 4A and in FIG. 5A, the images are standard images obtained from the raw depth data obtained from a non-contact monitoring system using a RealSense D415 camera. FIG. 4B and FIG. 5B show images obtained from the same depth data with a CLAHE transform applied to the raw depth data. It is noted that the enhancement to the image is across the entire image, not just in the region of interest (ROI), shown in the brackets, which is monitored for the physiological parameter.

It is also noted that although the images provided herein show a bed (e.g., a hospital bed) either empty or with a lying patient thereon, the non-contact monitoring may be focused on a seated patient (e.g., seated in a bed or on a chair), on a standing patient, or a patient in any other position and/or location.

The data manipulation, overall, includes applying a histogram equalization transform to the depth data to flatten, smooth, and/or filter the histogram of the data. A colormap can be applied to provide color contrast. By utilizing the adaptive equalization, such as of CLAHE transform, in the manner as describe herein, the color scale of the raw data image is maintained while providing a high contrast in areas where there is a large change in the depth data.

In some methods, the data manipulation includes decomposing the raw data image into a different colorspace (the colorspace having three channels), applying the histogram equalization transform to flatten, smooth and/or filter the histogram, and then merging the three channels back together to the original colorspace. The histogram equalization transform is applied to the perceptual lightness (e.g., luminosity or other light or brightness aspect) of the colorspace. To enhance the image from the depth data, it is the perceptual lightness aspect that is optimized. By utilizing the adaptive equalization of the transform in the manner as described herein, the grey scale of the raw data image is maintained while providing a high contrast in areas where there is a large change in the depth data.

Figure 6:
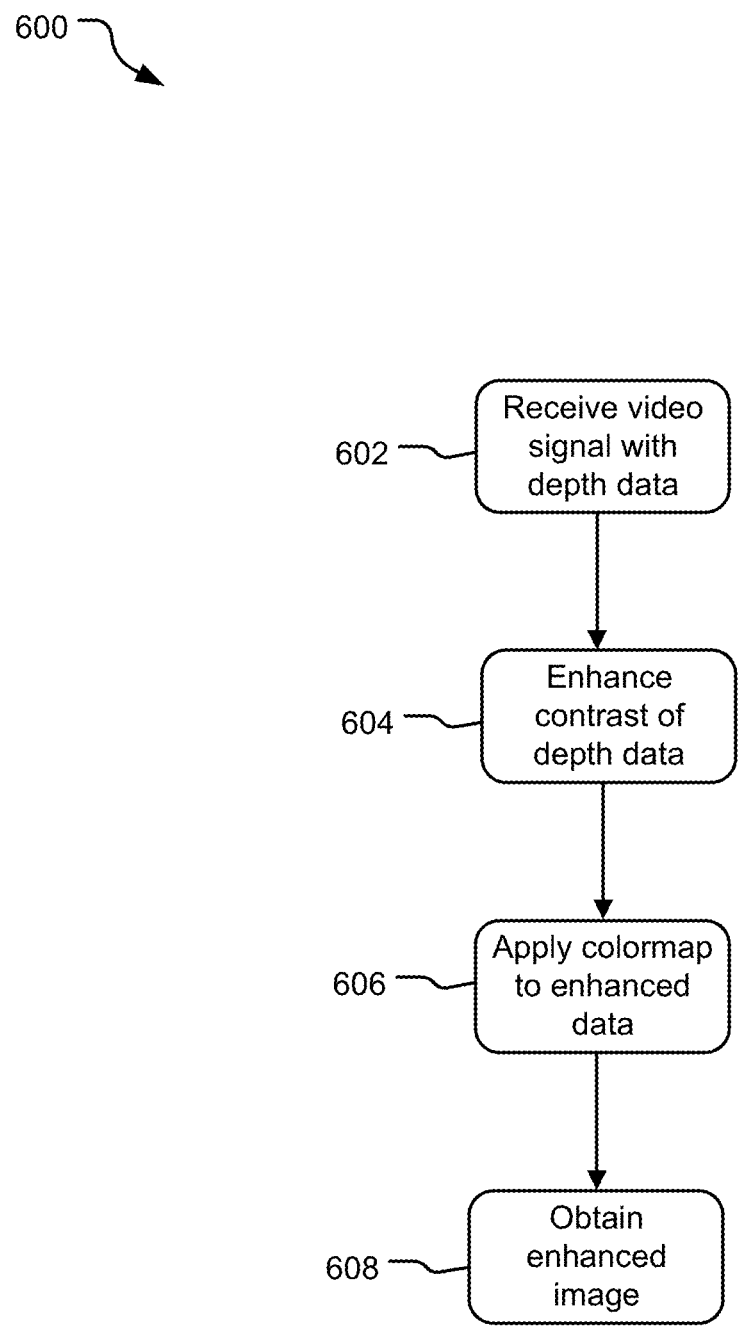
FIG. 6 is a stepwise method of an example method for enhancing the visual image from a non-contact patient monitoring system according to various embodiments described herein.

FIG. 6 shows, stepwise, an overall method 600 for manipulating depth data to enhance the resultant visual image, whether the image is the patient and background (as in FIG. 4B) or only background (as in FIG. 5B).

In step 602, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s). In step 604, the contrast of the depth data is enhanced, e.g., transformed, to apply a visual depth indication. In step 606, a colormap is applied to the enhanced data. In step 608, an enhanced image is obtained, enhanced in details in relation to an image from the original, untransformed, depth data.

Figure 7:
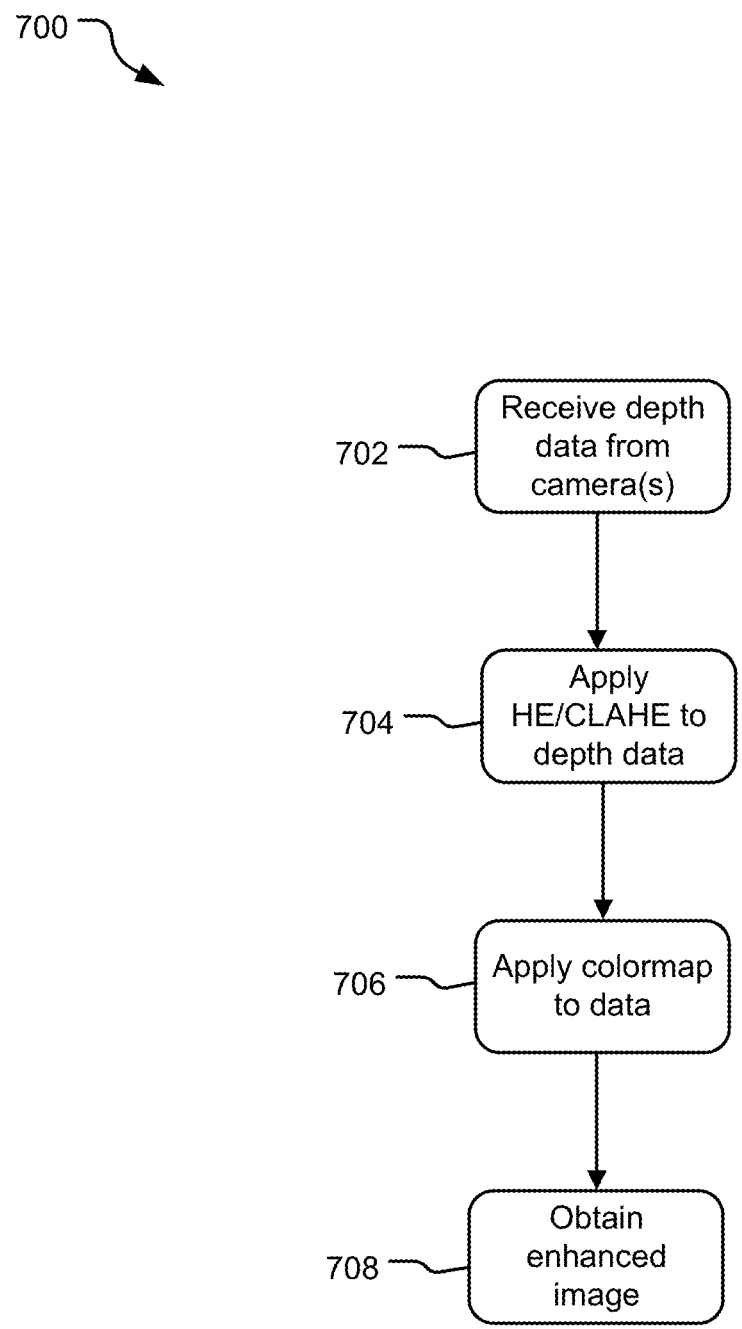
FIG. 7 is a stepwise method of another example method for enhancing the visual image from a non-contact patient monitoring system according to various embodiments described herein.

Another overall method 700, for manipulating depth data to enhance the resultant visual image, whether the image is the patient and background (as in FIG. 4B) or only background (as in FIG. 5B), is shown in FIG. 7.

In step 702, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s). In step 704, a histogram equalization (HE) transform, such as a CLAHE transform, is applied to the depth data to enhance the depth data. In step 706, a colormap is applied to the transformed (e.g., flattened, smoothed, filtered) data, to apply a visual depth indication. In step 708, an enhanced image is obtained, enhanced in details in relation to an image from the original, untransformed, depth data from the video signal.

In one example method, the transformed depth data is converted to a color image by way of applying a colormap to provide a visual distinction of the depth, due to changes in color proportional to the transformed depth data. Any colormap suitable for the data is acceptable. Examples of suitable colormaps include "bone," "viridis," "parula," "jet," etc.

In some embodiments, two different colors or colormaps may be used for the enhanced image. For example, a bed may be shown in a different color or colormap than a patient; this may be accomplished by applying one color to objects that are closer to the camera(s) (e.g., a patient) and another color to objects that are farther away (e.g., the bed on which the patient is laying). In some embodiments, a different color or colormap can be limited to a distinct area, e.g., outlined area, such as a patient's chest or face. Medical devices, e.g., tubing, leads, sensors, etc., may be shown in a different color or colormap.

Figure 8:
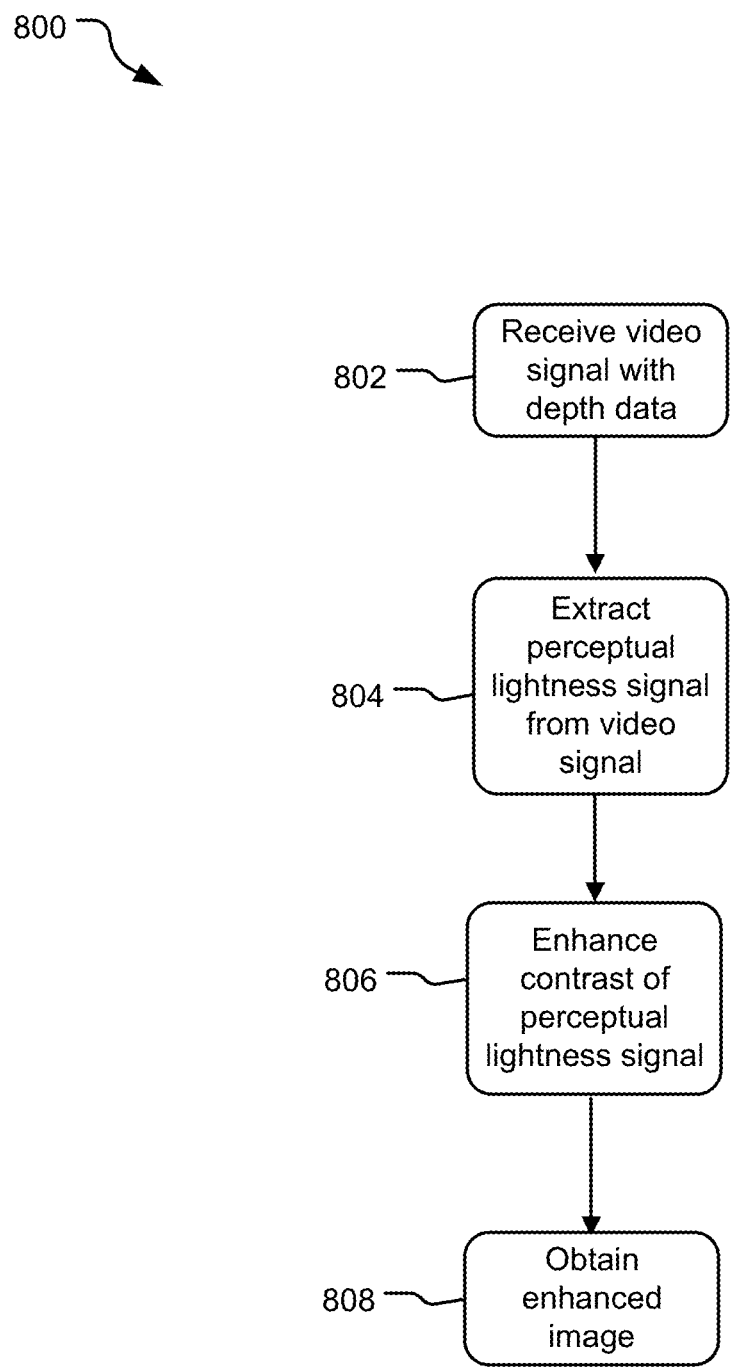
FIG. 8 is a stepwise method of another example method for enhancing the visual image from a non-contact patient monitoring system according to various embodiments described herein.

FIG. 8 shows, stepwise, another overall method 800 for manipulating depth data to enhance the resultant visual image, whether the image being the patient and background (as in FIG. 4B) or only background (as in FIG. 5B).

In step 802, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s). In step 804, the perceptual lightness (e.g., luminosity) signal is extracted from the video signal, and in step 806 the contrast of the signal is enhanced. In step 808, an enhanced image is obtained, enhanced in details in relation to an image from the original, untransformed, depth data from the video signal.

Figure 9:
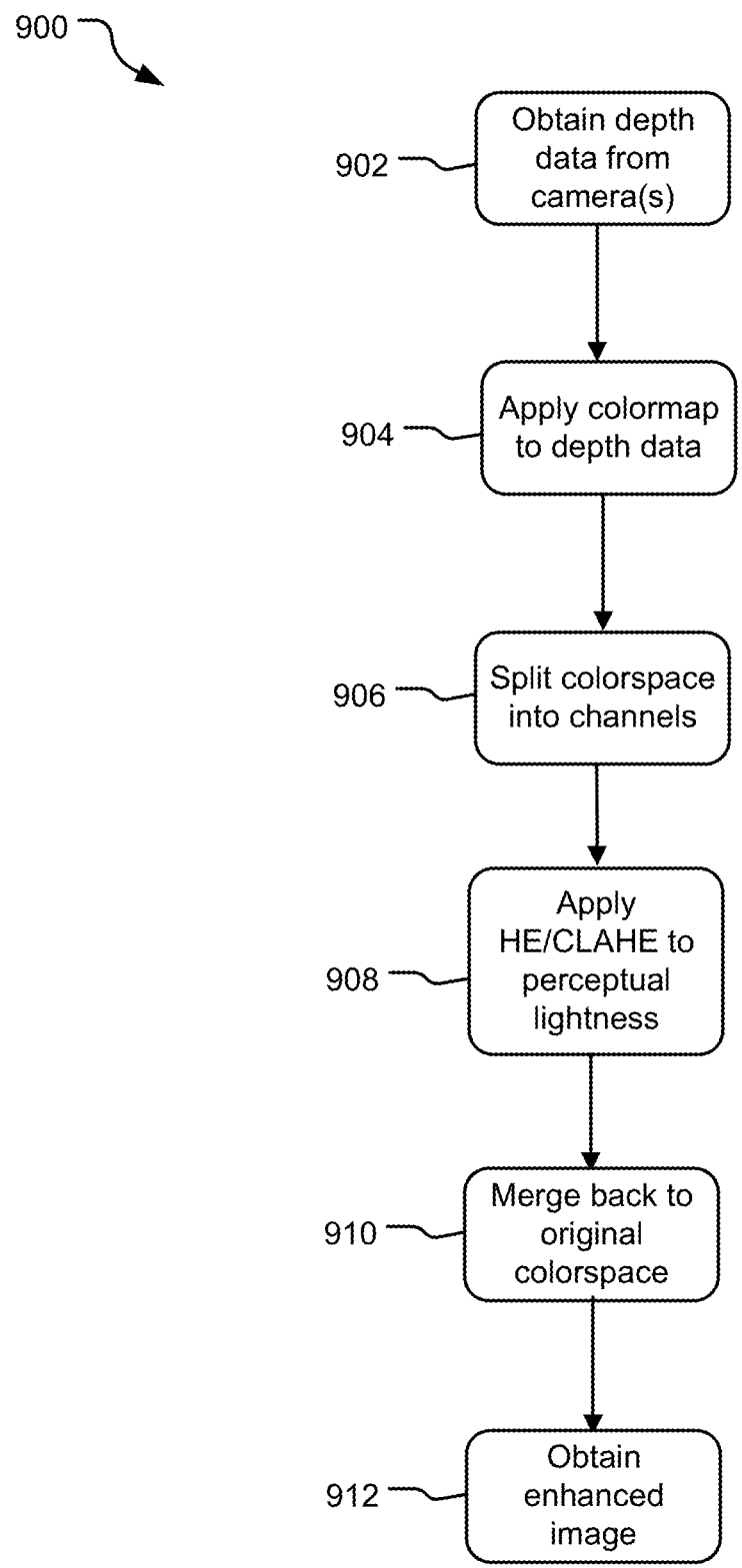
FIG. 9 is a stepwise method of another example method for enhancing the visual image from a non-contact patient monitoring system according to various embodiments described herein.

FIG. 9 shows, stepwise, another overall method 800 for manipulating depth data to enhance the resultant visual image, whether the image being the patient and background (as in FIG. 4B) or only background (as in FIG. 5B).

In step 902, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s). In step 904, a colormap is applied to the depth data. In step 906, the three channels of the colormapped-depth are split, with one of the channels being perceptual lightness (e.g., luminosity, lightness, brightness, or similar). In step 908, a CLAHE transform is applied to the perceptual lightness channel of the colorspace. In step 910, the channels are merged back to the original colorspace. In step 912, an enhanced image is obtained, enhanced in details in relation to an image from the original, untransformed, depth data.

In one example method, the depth data is obtained in RGB colorspace (having channels: red and green and blue). The image is decomposed into LAB colorspace (having channels: luminosity and green-red and blue-yellow). A CLAHE transform is applied to the luminosity aspect, to flatten, smooth and/or filter the luminosity histogram, thus adding contrast to the channel. The LAB channels are converted back to RGB, so that the final image is back to RGB colorspace.

Other examples of suitable colorspaces include HSL (having channels: hue and saturation and lightness or luminance), HSV (having channels: hue and saturation and value), HSB (having channels: hue and saturation and brightness), and others such as cylindrical transformation, YCbCr (channels: luma and blue-difference and red-difference), YUV, and subtractive CMYK (cyan, magenta, yellow, black) and CMY (cyan, magenta, yellow).

Figure 10A:
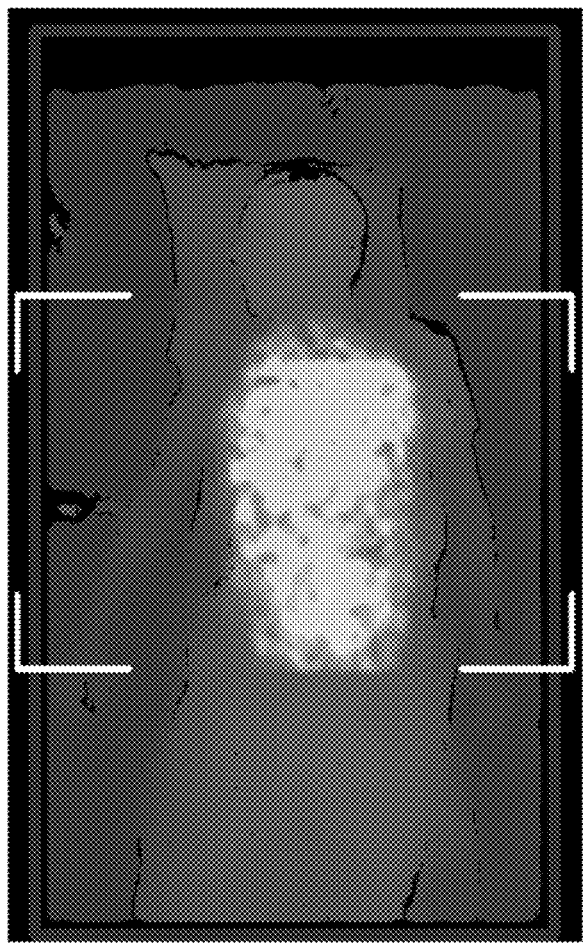
FIG. 10A is an image of a patient being monitored by a conventional non-contact patient monitoring system with a respiratory visual overlay.
Figure 10B:
FIG. 10B is an image of the patient being monitored by the non-contact monitoring system with a respiratory visual overlay including a background enhancement.

FIGS. 10A and 10B also show the visual benefit obtained by applying the CLAHE transform to the depth data. In these figures, the background image, which includes the patient, has been overlaid with a visual representation of the parameter being monitoring, which in this example, is respiration, particularly, a visual representation of inhalation. The visual representation of inhalation is obtained, as described above, by the change in distance of the patient's chest to the camera(s).

In FIG. 10A, the image is a standard image obtained from the raw depth data obtained from a non-contact monitoring system and overlayed with the respiration representation also obtained from the raw depth data. FIG. 10B shows the image obtained from the same depth data with the CLAHE transform applied to the raw depth data for the background and the patient overlayed with the respiration representation obtained from the raw depth data. It is noted that the enhancement to the image is across the entire image, not just in the region of interest (ROI), shown in the brackets, which is monitored for the respiration parameter.

Depending on the system parameters of the non-contact monitoring system being used for the monitoring of the physiological parameter (respiration, in this example), the forward and backward movement of the patient's chest is evidenced by a color change applied by the monitoring system. For example, when the ROI region is moving towards the camera (e.g., on an inhale), a green overlay can be shown, whereas when the ROI region is moving away from the camera (e.g., on an exhale), no color overlay is shown. In other implementations, the user or viewer of the monitoring system can select the settings of the visual output. For example, the user may desire a green overlay for an inhale and a red overlay for an exhale, or, a white overlay for an inhale and no color overlay for an exhale, e.g., for user that are red/green colorblind. In some arrangements, the strength, tone, or brightness of the selected color may change as the movement (e.g., distance) changes.

Figure 11:
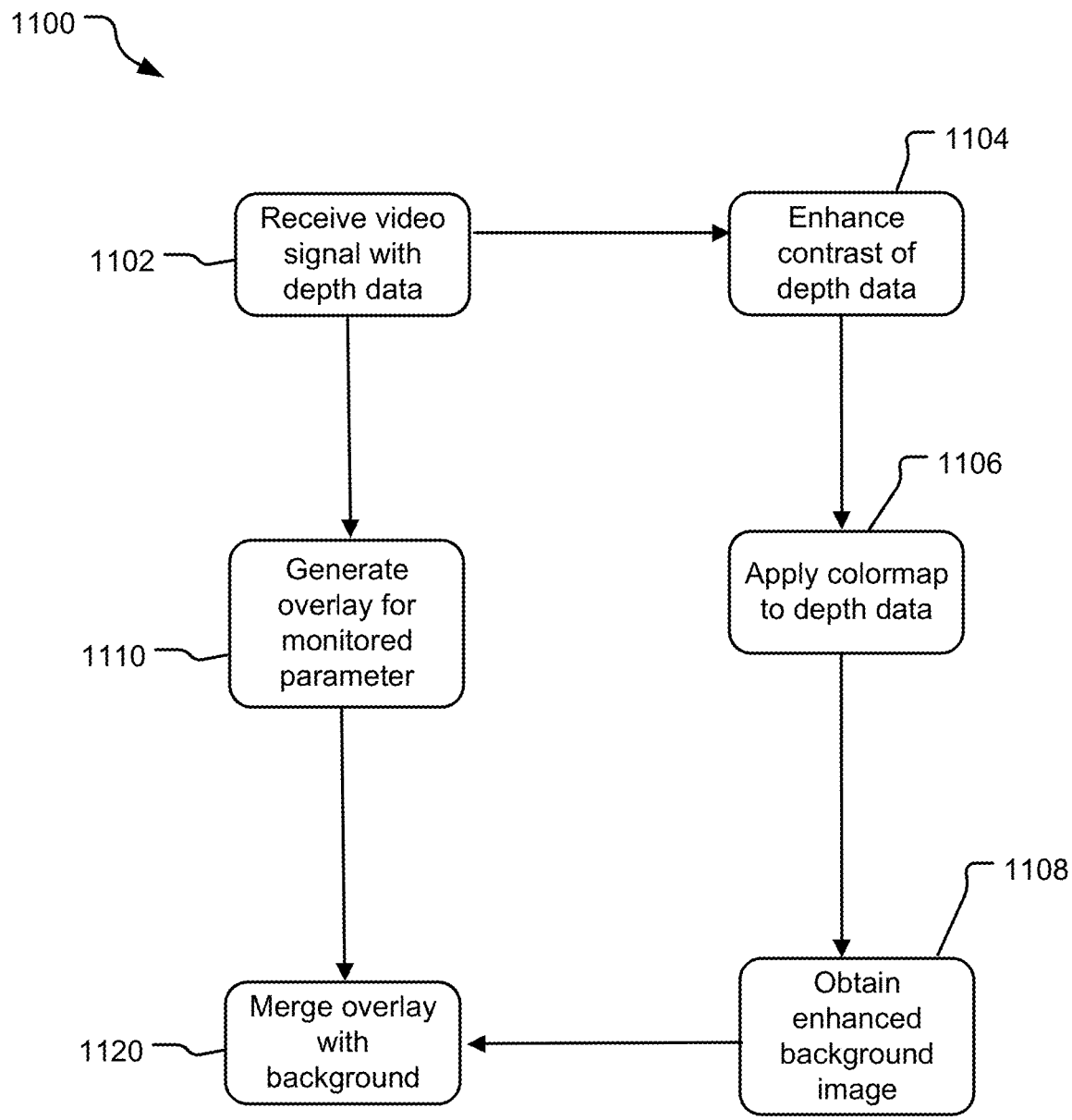
FIG. 11 is a stepwise method of an example method for enhancing the visual image from a non-contact patient monitoring system according to various embodiments described herein.

FIG. 11 shows, stepwise, another overall method 1100 for manipulating depth data to enhance the resultant visual image. This method 1100 enhances the background and/or the patient and combines the enhanced image with a monitored physiological parameter (as in FIG. 10B).

In step 1102, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s). In step 1104, the contrast of the depth data from step 1102 is enhanced; this enhanced data thus has a colormap applied thereto in step 1106. With the colormap applied, an enhanced background image is obtained in step 1108.

Prior to, subsequent to, or simultaneous to applying steps 1104 through 1108, the depth data from step 1102 is used to generate a visual overlay for the monitored physiological parameter, such as respiration, in step 1110.

In step 1120, the visual image of the parameter from step 1110 is merged with the enhanced background image from step 1108.

Figure 12:
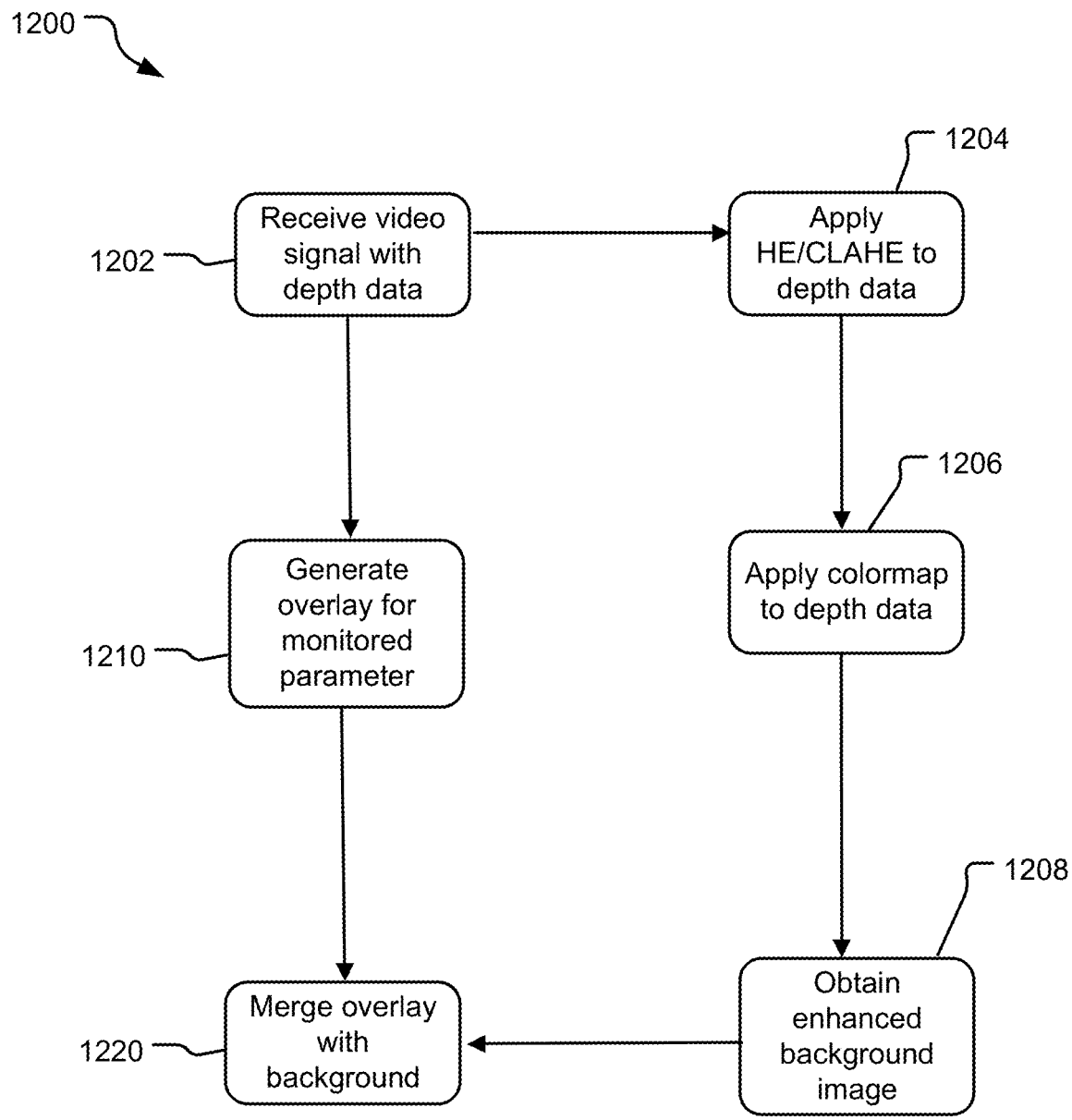
FIG. 12 is a stepwise method of another example method for enhancing the visual image from a non-contact patient monitoring system according to various embodiments described herein.

FIG. 12 shows, stepwise, another overall method 1200 for manipulating depth data to enhance the resultant visual image. This method 1200 enhances the background and/or the patient and combines the enhanced image with a monitored physiological parameter (as in FIG. 10B).

In step 1202, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s). In step 1204, a histogram equalization (HE) (e.g., CLAHE) transform is applied to the depth data from step 1202; this flattened data thus has a colormap applied thereto in step 1206. With the colormap applied, an enhanced background image is obtained in step 1208.

Prior to, subsequent to, or simultaneous to applying steps 1204 through 1208, the depth data from step 1202 is used to determine the monitored physiological parameter, such as respiration, in step 1210.

In step 1220, the visual image of the parameter from step 1210 is merged with the enhanced background image from step 1208.

Figure 13:
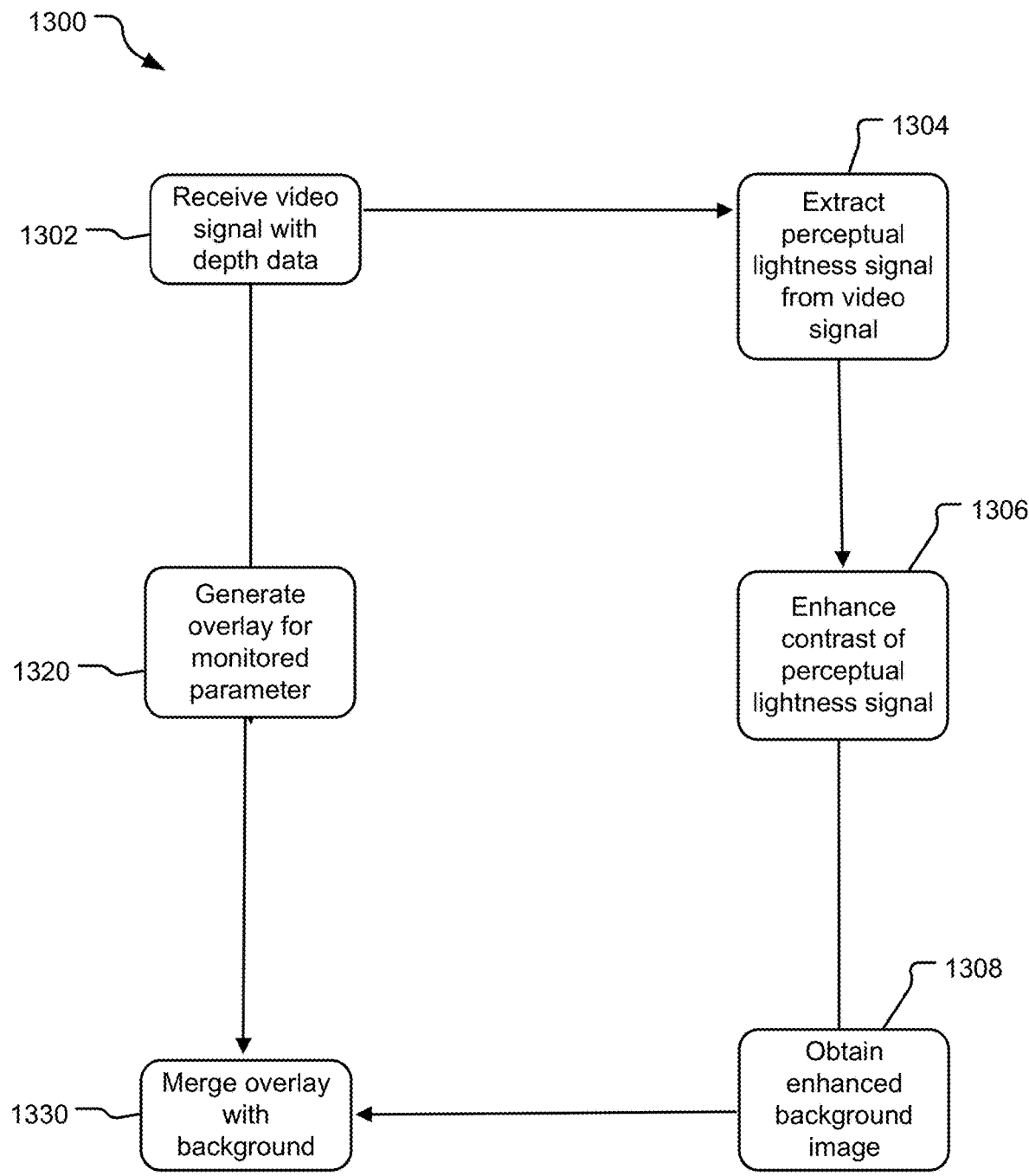
FIG. 13 is a stepwise method of another example method for enhancing the visual image from a non-contact patient monitoring system according to various embodiments described herein.

FIG. 13 shows, stepwise, another overall method 1300 for manipulating depth data to enhance the resultant visual image. This method 1300 enhances the background and/or the patient and combines the enhanced image with a monitored physiological parameter (as in FIG. 10B).

In step 1302, a video signal that includes depth data is received from camera(s) of a non-contact monitoring system for a region of interest, which typically includes a patient. The monitoring is done via depth data obtained from depth camera(s) based on the distance of the patient or other surface in relation to the depth camera(s).

In step 1304, the perceptual lightness signal is extracted from the video signal and in step 1306, the contrast of the perceptual lightness signal is enhanced. From the enhanced perceptual lightness signal, an enhanced background image is obtained in step 1308.

Prior to, subsequent to, or simultaneous to applying steps 1304 through 1308, the depth data from step 1302 is used to generate a visual overlay representative of a monitored physiological parameter, such as respiration, in step 1320.

In step 1330, the visual overlay of the parameter from step 1320 is merged with the enhanced background image from step 1308.

Figure 14:
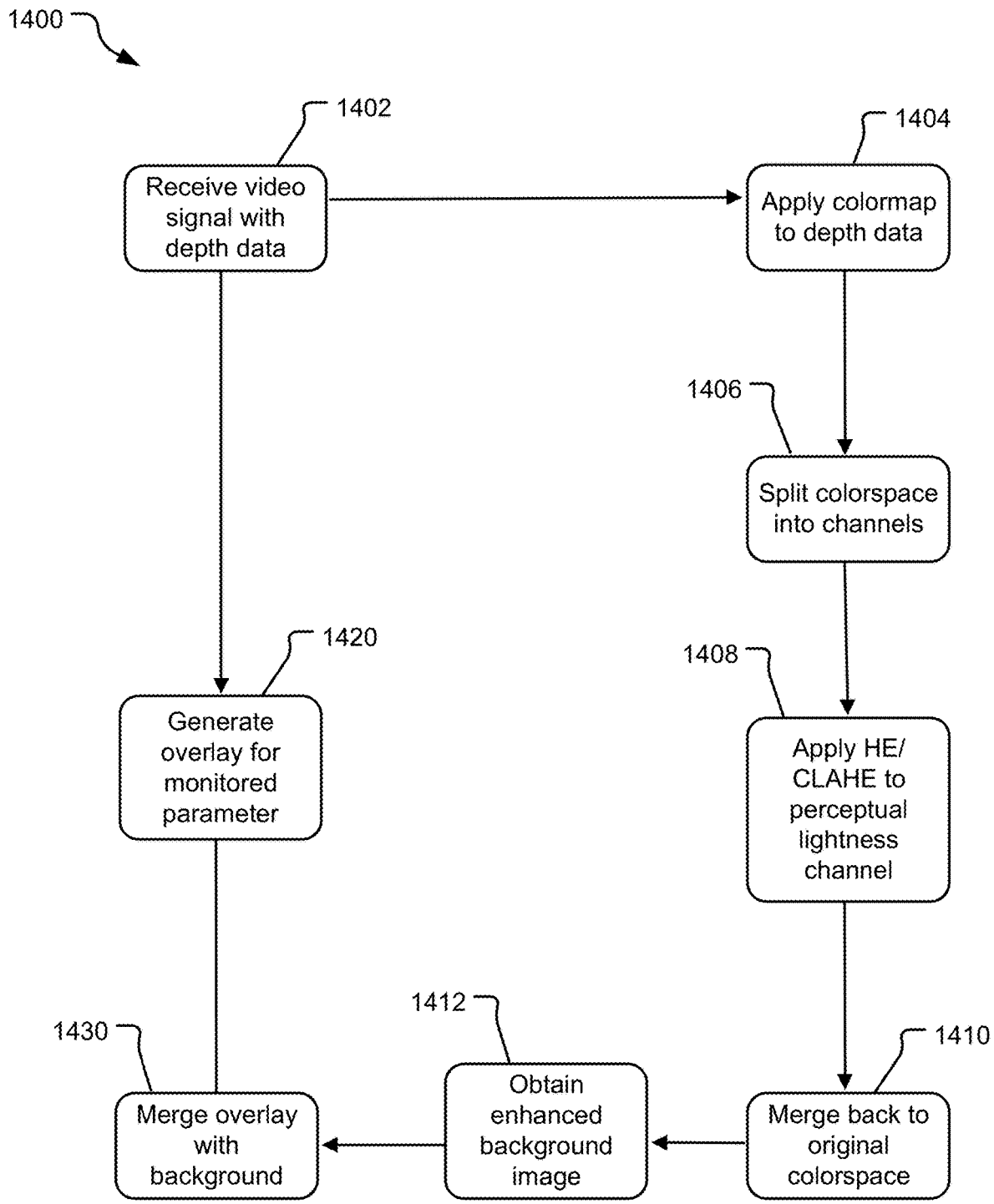
FIG. 14 is a stepwise method of another example method for enhancing the visual image from a non-contact patient monitoring system according to various embodiments described herein.

FIG. 14 shows, stepwise, yet another overall method 1400 for manipulating depth data to enhance the resultant visual image.

In step 1402, a video signal that includes depth data is received from camera(s) of a non-contact monitoring system for a region of interest, which typically includes a patient. In step 1404, a colormap is applied to the depth data. In step 1406, the three channels of the colormapped-depth are split, with one of the channels being perceptual lightness (e.g., luminosity, lightness, brightness, or similar). In step 1408, an HE (e.g., CLAHE) transform is applied to the perceptual lightness channel. In step 1410, the channels are merged back to the original colorspace, resulting in the enhanced background image in step 1412.

Prior to, subsequent to, or simultaneous to applying steps 1404 through 1412, the depth data from step 1402 is used to generate a visual overlay of the monitored physiological parameter, such as respiration, in step 1420.

In step 1430, the visual overlay image of the parameter from step 1420 is merged with the enhanced background image from step 1412.

In some embodiments, two different colors or colormaps may be used for the enhanced image. For example, a bed may be shown in a different color or colormap than a patient; this may be accomplished by applying one color to objects that are closer to the camera(s) (e.g., a patient) and another color to objects that are farther away (e.g., the bed on which the patient is laying). In some embodiments, a different color or colormap can be limited to a distinct area, e.g., outlined area, such as a patient's chest or face. In some embodiments, the colormap of the background image is selected to be more neutral in color than the overlay of the physiological parameter. For example, the background image may have a colormap such as "bone," "grey," "pink," "pastel," while the overlay has more pronounced color(s), such as, e.g., red-green. Medical devices, e.g., tubing, leads, sensors, etc., may be shown in a different color or colormap.

Additionally, in some embodiments, the depth data used for the background image and/or the physiological parameter overlay may be less than the available data; the data used for the displayed image may be limited to a range more focused on the subject, e.g., the patient.

In some instances, even the enhanced image may appear "washed out" due to the colormap representing a broad range of depth or distance from the camera(s) (e.g., 400 mm to 1600 mm, or, 500 mm to 1800 mm, or, e.g., 200 mm to 2000 mm). However, a desired subject, such as the patient on the bed or the patient alone, is found in a much narrower distance range, e.g., 900 mm to 1300 mm, or, e.g., 900 to 1500 mm. Because of this, the desired subject is shaded or colored with a subset of the available colors of the colormap, with many colors not used or seen on the image. By applying the full colormap to a narrow depth range, the full range of colors can be seen in the image, resulting in the desired subject being more distinct from the surrounding background.

In order to use less than the full depth data, the desired data range must be selected. In some instances, the desired range may fluctuate, e.g., if a patient readjusts in bed; thus, the selected (narrow) range is preferably dynamically adjusted.

One example for selecting the range, for example when respiration is being monitored, is by determining regions in the field of view of the monitoring system that have active respiration and from those regions developing a mask that is applied to focus the respiratory monitoring and inhibit collection of data noise. The depth range within this mask would be used as the range, optionally with a margin applied to each end to better ensure all relevant surrounding areas are included. The margin could be predetermined (e.g., 200 mm on each end) or could be dynamic (e.g., 10% of the range added on each end). In another example, the range can be limited to all the depth data within the target regions, optionally with a margin. Alternately, the range may be set by the user. In another example, the largest and smallest values of the depth data could be used to set the range, which may be less than the monitored range (e.g., 400 mm to 1600 mm, etc.). After obtaining the narrowed range by any of these methods, the data may be filtered, so that the data changes slowly over time and does not cause artefacts in the displayed image.

Thus, described herein are methods and systems for improving or enhancing a visual output image from non-contact monitoring of a patient, by applying an adaptive histogram equalization transform, such as a contrast limited adaptive histogram equalization (CLAHE) transform, to depth data obtained from a non-contact monitoring system.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

The invention claimed is:

1. A method comprising:
   receiving a video signal having depth data from a non-contact patient monitoring system, wherein the video signal defines an image having a patient portion and a non-anatomical background portion;
   extracting a perceptual lightness channel from the video signal;
   enhancing the contrast of the perceptual lightness channel;
   merging the perceptual lightness channel back to obtain an enhanced image having an enhanced patient portion and an enhanced non-anatomical background portion;
   determining an overlay of a monitored physiological parameter by the non-contact patient monitoring system;
   merging the enhanced image with the overlay; and
   displaying the enhanced image including the enhanced patient portion and the enhanced non-anatomical background portion.

2. The method of claim 1, wherein extracting the perceptual lightness channel comprises applying a colormap to the depth data and splitting a colorspace of the colormap into channels including the perceptual lightness channel.

3. The method of claim 1, wherein enhancing the contrast of the perceptual lightness channel comprises applying a histogram equalization transform to the perceptual lightness channel.

4. The method of claim 3, wherein the histogram equalization transform is a contrast limited adaptive histogram equalization (CLAHE) transform.

5. The method of claim 1, wherein the monitored physiological parameter determined by the non-contact patient monitoring system is respiration.

6. The method of claim 1, wherein the non-anatomical background includes a bed that the patient is occupying.

* * * * *